United States Patent
Li et al.

(10) Patent No.: US 6,567,081 B1
(45) Date of Patent: May 20, 2003

(54) METHODS AND ARRANGEMENTS FOR COMPRESSING IMAGE-BASED RENDERING (IBR) DATA USING ALIGNMENT AND 3D WAVELET TRANSFORM TECHNIQUES

(75) Inventors: Jin Li, Beijing (CN); Ya-Qin Zhang, West Windsor, NJ (US); Yunnan Wu, Beijing (CN); Lin Luo, Hefei (CN)

(73) Assignee: Microsoft Corporation, Redmond, WA (US)

( * ) Notice: Subject to any disclaimer, the term of this patent is extended or adjusted under 35 U.S.C. 154(b) by 121 days.

(21) Appl. No.: 09/598,189

(22) Filed: Jun. 20, 2000

Related U.S. Application Data

(60) Provisional application No. 60/177,452, filed on Jan. 21, 2000.

(51) Int. Cl.[7] .............................................. G06T 17/00
(52) U.S. Cl. ........................................ 345/419; 382/240
(58) Field of Search ................................. 345/418, 419; 382/240, 226, 79, 232, 233, 248

(56) References Cited

U.S. PATENT DOCUMENTS 6,343,155 B1 * 1/2002 Chui et al. .................. 382/240
6,356,665 B1 * 3/2002 Lei et al. ..................... 382/240

* cited by examiner

*Primary Examiner*—Cliff N. Vo
(74) *Attorney, Agent, or Firm*—Lee & Hayes, PLLC

(57) ABSTRACT

Methods and arrangement are provided for compressing and transporting image-based rendering (IBR) data using alignment and three-dimensional (3D) wavelet transform techniques, and selectively decompressing portions of the resulting compressed data to render various two-dimensional (2D) views of a 3D scene. A compression engine compresses the IBR data using a 3D wavelet transform and outputs a compressed bitstream comprising encoded frequency coefficients associated with the IBR data. This compressed bitstream can then be provided to a separate decompression engine that selectively decodes portions of the compressed bitstream based on an access request for image data associated with a desired view from a rendering engine. Through a mixed cache, the progressive inverse wavelet synthesis (PIWS) engine decompresses the decoded portions with minimum calculation, and provides the decompressed IBR data to the rendering engine. The rendering engine is therefore able to render the decompressed IBR data without having to have the entire IBR bitstream decoded and decompressed at any one time.

106 Claims, 16 Drawing Sheets

602

604

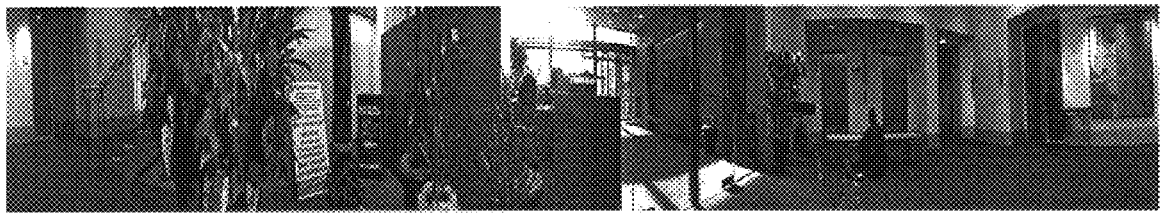

Fig. 17

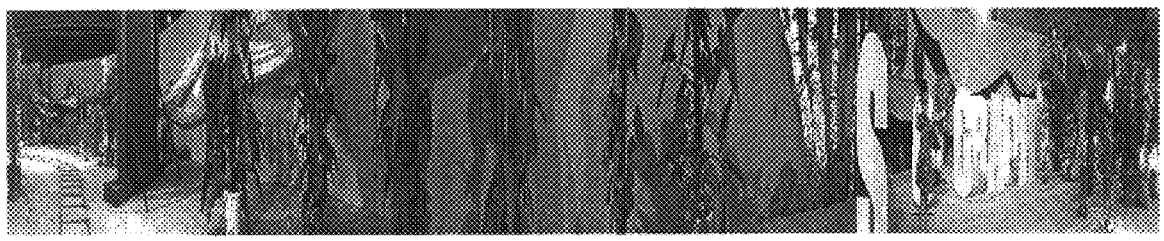

Fig. 18

| Wavelet Packet Structure | A | B | C | D | E |
|---|---|---|---|---|---|
| PSNR: Y (dB) | 30.6 | 31.0 | 31.1 | 30.9 | 30.3 |
| PSNR: U (dB) | 36.4 | 37.1 | 37.3 | 38.4 | 37.6 |
| PSNR: V (dB) | 37.2 | 37.9 | 38.0 | 38.9 | 38.1 |

Fig. 19

|  | LOBBY (0.4bpp) | LOBBY (0.2bpp) | KIDS (0.4bpp) | KIDS (0.6bpp) |
|---|---|---|---|---|
| MPEG-2 (dB) | Y: 34.8<br>U: 39.9<br>V: 39.1 | Y: 32.2<br>U: 38.7<br>V: 38.1 | Y: 30.1<br>U: 36.6<br>V: 36.7 | Y: 31.9<br>U: 38.0<br>V: 38.1 |
| 3D wavelet + tree coder (dB) | Y: 34.5<br>U: 41.6<br>V: 41.2 | Y: 31.4<br>U: 40.1<br>V: 39.7 | Y: 29.0<br>U: 35.8<br>V: 36.6 | Y: 31.1<br>U: 37.3<br>V: 38.0 |
| 3D wavelet + Golomb-Rice coder (dB) | Y: 34.4<br>U: 41.5<br>V: 41.2 | Y: 31.3<br>U: 40.0<br>V: 39.7 | Y: 29.0<br>U: 35.7<br>V: 36.5 | Y: 31.0<br>U: 37.0<br>V: 37.9 |
| 3D wavelet + arithmetic coder (dB) | Y: 35.0<br>U: 41.9<br>V: 41.5 | Y: 31.9<br>U: 40.3<br>V: 39.9 | Y: 29.4<br>U: 36.5<br>V: 37.2 | Y: 31.5<br>U: 38.0<br>V: 38.6 |

|  | PIWS (Slits/Sec) | SSD (Slits/Sec) | BSD (Slits/Sec) |
|---|---|---|---|
| Full Decompression | 9756 | 197 | 8000 |
| RT: 500 views, 4196 slits | 7160 | 204 | 1424 |
| FW: 250 views, 8630 slits | 7583 | 202 | 3512 |
| ST: 50 views, 12403 slits | 9260 | 209 | 5044 |

| Mode/Algorithm | Rendering setting | PS | BI |
|---|---|---|---|
| RT | VQ | 19.7 | 16.3 |
|  | RBC | 16.8 | 13.9 |
|  | PIWS | 17.6 | 14.3 |
| FB | VQ | 19.0 | 15.8 |
|  | RBC | 16.4 | 13.9 |
|  | PIWS | 15.8 | 13.5 |
| ST | VQ | 17.7 | 14.9 |
|  | RBC | 12.5 | 10.9 |
|  | PIWS | 7.9 | 7.3 |

*Fig. 26*

METHODS AND ARRANGEMENTS FOR COMPRESSING IMAGE-BASED RENDERING (IBR) DATA USING ALIGNMENT AND 3D WAVELET TRANSFORM TECHNIQUES

RELATED CASES

This non-provisional utility application claims priority to the provisional application Serial No. 60/177,452, filed on Jan. 21, 2000, entitled "Methods And Arrangements For Compressing Image-Based Rendering (IBR) Data Using Alignment And 3D Wavelet Transform Techniques", which is incorporated herein by reference and is commonly assigned to the assignee of the present invention.

TECHNICAL FIELD

This invention relates to image-based rendering, and more particularly to methods and arrangements for compressing and transporting image-based rendering (IBR) data using alignment and three-dimensional (3D) wavelet transform techniques, and selectively decompressing portions of the resulting compressed data to render various two-dimensional (2D) views of a 3D scene.

BACKGROUND OF THE INVENTION

There is a continuing interest, within the computer graphics community, in image-based rendering (IBR) systems. These systems are fundamentally different from traditional geometry-based rendering systems, in that the underlying information (i.e., data representation) is composed of a set of photometric observations (e.g., digitized images/photographs) rather than being either mathematical descriptions of boundary regions or discretely sampled space functions.

An IBR system uses the set of photometric observations to generate or render different views of the environment and/or object(s) recorded therein. There are several advantages to this approach. First, the display algorithms for IBR systems tend to be less complex and may therefore be used to support real-time rendering in certain situations. Secondly, the amount of processing required to view a scene is independent of the scene's complexity. Thirdly, the final rendered image may include both real photometric objects and virtual objects.

IBR systems can be complex, however, depending upon the level of detail required and the processing time constraints. For example, Adelson et al., in their article entitled "The Plenoptic Function And The Elements Of Early Vision", published in Computational Models of Visual Processing by The MIT Press, Cambridge, Mass. 1991, stated that a 7-dimensional plenoptic function can be implemented in an IBR system to completely represent a 3-dimensional dynamic scene. The 7-dimensional plenoptic function is generated by observing and recording the intensity of light rays passing through every space location as seen in every possible direction, for every wavelength, and at any time. Thus, imagine an idealized camera that can be placed at any point in space $(V_x, V_y, V_z)$. This idealized camera can then be used to select any of the viewable rays by choosing an azimuth angle ($\theta$) and elevation angle ($\phi$), as well as a band of wavelengths ($\lambda$). Adding an additional parameter (t) for time, produces a 7-dimensional plenoptic function:

$$p = P(\theta, \phi, \lambda, V_x, V_y, V_z, t)$$

Thus, given function p, to generate a view from a specific point in a particular direction, one need only to merely plug-in the values for $(V_x, V_y, V_z)$ and select from a range of ($\theta$, $\phi$) for some constant t for each desired a band of wavelengths ($\lambda$).

Accomplishing this in real-time, especially for a full spherical map or a large portion thereof, is typically beyond most computer's processing capability. Thus, there was a need to reduce the complexity of such an IBR system to make it more practical.

By ignoring the time (t) and the wavelength ($\lambda$) parameters, McMillan and Bishop in their article entitled "Plenoptic Modeling: An Image-Based Rendering System" published in Computer Graphics Proceedings (SIGGRAPH'95) August 1995, disclosed a plenoptic modeling scheme that generates a continuous 5-dimensional plenoptic function from a set of discrete samples. Further research and development by Gortler et al., lead to the development of the Lumigraph as disclosed in an article entitled "The Lumigraph" that was published in Computer Graphics Proceedings (SIGGRAPH'96) in August, 1996. Similarly, Levoy et al. developed a Lightfield as disclosed in an article entitled "Light Field Rendering" that was also published in Computer Graphics Proceedings (SIGGRAPH'96) in August of 1996. The Lumigraph and the Lightfield presented a clever 4-dimensional parameterization of the plenoptic function provided the object (or conversely the camera view) is constrained within a bounding box.

In an article entitled "Rendering With Concentric Mosaic", published in Computer Graphics Proceedings (SIGGRAPH'99) in August 1999, Shum & He introduced a COncentric Mosaic (COM) that reduced the plenoptic function to 3-dimensions by restricting the viewer's movement on a plane. This technique is described in co-pending, commonly assigned U.S. patent application Ser. No. 09/222488 entitled "Rendering With Concentric Mosaics."

In the COM technique taught by Shum & He, a mosaic image represents a collection of consecutive slit images of the surrounding 3D scene taken in a direction tangent to a viewpoint on a circle on the aforementioned plane within the scene. In this manner, mosaic image data is generated for a plurality of concentric circles on the plane, hence the name, "concentric mosaic." When a novel view on the plane is to be rendered, the COM technique considers the slit images within a stack of mosaic images of differing radiuses to determine how best to render the scene. This provides a powerful tool for conducting 3D walkthroughs of actual and/or virtual scenes.

The COM technique, however, tends to generate and require a significant amount of data. For example, let us assume that the mosaic image for each concentric circle is 240 pixels high by 1350 pixels long and that there are 320 concentric mosaic images generated to provide for adequate depth resolution within the scene. In this case, the resulting COM data would total nearly 300 mega-bytes (MB).

Storing and/or processing this amount of data can be a daunting task for many computers, especially when the walkthrough is to be displayed without significant or perceptible delays between rendered images. Moreover, transporting this amount of data, for example, over the Internet using a 56K baud modem is simply impractical.

As such, there has been a movement to compress the COM data, such that the COM techniques can be made readily available using current technology. For example, conventional vector quantization techniques have been used to compress the nearly 300 MB COM data down to 25 MB (about a 12:1 ratio). Unfortunately, a 25 MB data file requires about one hour to download using a 56K baud modem.

In a further example, each mosaic image can be compressed using a JPEG coder or similar still image encoders. However, JPEG coding tends to be very inefficient since each COM scene consists of multiple highly correlated images.

Alternatively, a COM scene can be compressed with an MPEG or like video coder. Unfortunately, the MPEG encoding technique is also impractical, because it does not provide for random (selective) access to portions of the COM data during rendering. Moreover, although the peak signal-to-noise ratio (PSNR) performance of the MPEG coder may be satisfactory, a resulting COM scene encoded as MPEG may lack sufficient visual quality, because the MPEG standard is optimized for image streams that are played continuously, while the COM scene is essentially viewed statically.

Consequently, there is a need for methods and arrangements that can be used to reduce the amount of data, such as, e.g., COM data, required to be generated, stored, transported, or otherwise accessed in rendering a scene. Preferably, the methods and arrangements will support the scalability requirements associated with various devices and provide for efficient communication over various communication services.

SUMMARY OF THE INVENTION

Methods and arrangements are provided for substantially reducing the amount of data, such as, e.g., COM data, required to be generated, stored, transported, or otherwise accessed in rendering a three-dimensional (3D) scene. The methods and arrangements compress image-based rendering (IBR) data using alignment and 3D wavelet transform techniques. The compressed data can be easily transported and portions can be selectively decompressed to render various two-dimensional (2D) views of the 3D scene. Thus, the methods and arrangements can support the scalability requirements associated with many different devices and can be adapted for different communication services.

By way of example, an arrangement is provided for compressing and transporting image-based rendering (IBR) data using alignment and three-dimensional (3D) wavelet transform techniques, and selectively decompressing portions of the resulting compressed data to support rendering of desired views of a 3D scene. Here, a compression engine compresses the IBR data using a 3D wavelet transform and outputs a compressed bitstream that includes encoded frequency coefficients associated with the IBR data. This compressed bitstream is then provided (e.g., transported, etc.) to a decompression engine that selectively decodes portions of the compressed bitstream based on an access request for image data associated with the desired view from a rendering engine. The decompression engine decompresses the decoded portions using an inverse wavelet transform, and provides the decompressed IBR data to the rendering engine. The rendering engine is therefore able to render the decompressed IBR data without having to have the entire IBR bitstream decoded and decompressed at any one time.

BRIEF DESCRIPTION OF THE DRAWINGS

A more complete understanding of the various methods and arrangements of the present invention may be had by reference to the following detailed description when taken in conjunction with the accompanying drawings wherein:

FIG. 17 is an exemplary IBR image.

FIG. 18 is an exemplary IBR image.

FIG. 19 is a table depicting experimental results for an IBR scene compressed with different wavelet packet decomposition structures.

FIG. 20 is a table depicting further experimental results of 3D IBR scene compression results.

FIG. 26 is a table comparing the overall rendering speed of PIWS with a spatial vector quantization (SVQ) scheme and a reference block coding (RBC) scheme.

DETAILED DESCRIPTION

Introduction

The logical operations of the various embodiments of the present invention are implemented (1) as a sequence of computer implemented steps running on a computing system or like device/appliance, and/or (2) as interconnected machine logic modules within the computing system or like device/appliance. The implementation is a matter of choice dependent on the performance requirements of the computing system implementing the invention. Accordingly, the logical operations described herein are referred to variously as operations, steps, engines or modules. While the following description is directed towards Concentric Mosaic (COM) images/data, those skilled in the art will recognize that other types of mosaic or partial mosaic image/object data may benefit from the various methods and arrangements described herein.

Functional Overview of an Exemplary Arrangement

Figure 1:
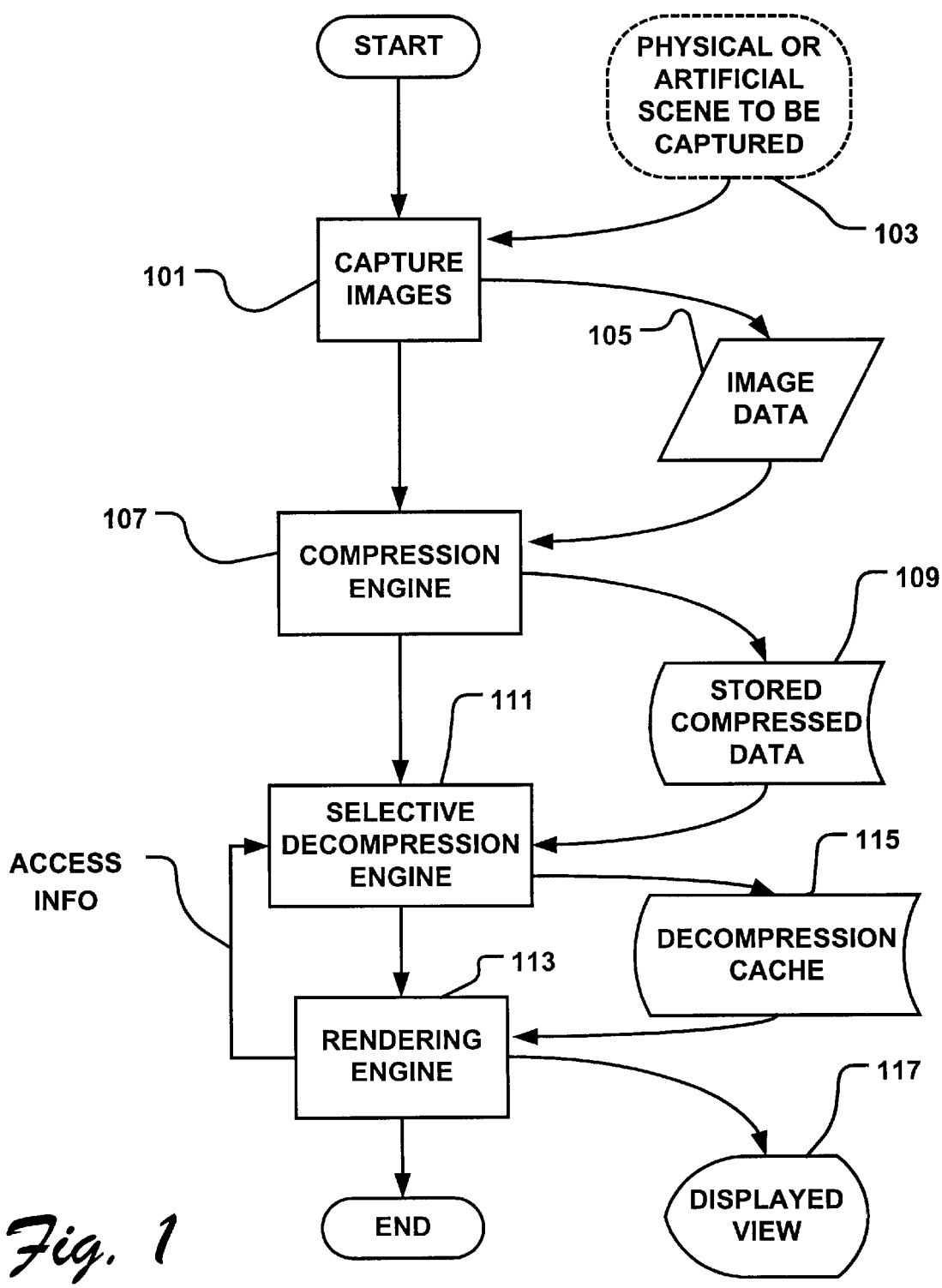
FIG. 1 is a block diagram depicting an exemplary arrangement that generates or otherwise accesses image-based rendering (IBR) data, the arrangement includes a compression engine, a selective decompression engine and a rendering engine.

Reference is now made to FIG. 1, which is a block diagram depicting an arrangement 100 that generates or otherwise accesses COM data 105. The arrangement includes a capture module 101, a compression engine 107, a selective decompression engine 111, and a rendering engine 113.

Capture module 101, which is optional, operates to capture a mosaic image of scene 103. Scene 103 can be a physical scene captured by a camera or a plurality of cameras, an artificial scene created by an artist using a graphics system and shot by a virtual camera, or a mixture of the two. Capture module 101 essentially scans the scene 103 and creates a plurality (e.g., an array) of digitized mosaic images that form COM data 105. An exemplary capture module 101 for generating COM data is described in the Background section above, further sections below, and in the above-referenced patent application entitled, "Rendering With Concentric Mosaics", which is expressly incorporated herein, by reference and for all purposes.

With respect to FIG. 1, capture module 101 is optional in that COM data 105 may also be a data file that is simply provided to arrangement 100 by some other arrangement. Regardless as to how it is generated, COM data 105 is provided to compression engine 107.

Preferably, compression engine 107 is configured to compress the image data by at least an order of magnitude. Accordingly, if the image data 105 for a plurality of mosaics of scene 103 is hundreds of megabytes, compression engine 107 reduces the quantity of image data to megabytes or tens of megabytes, depending on the available memory and desired rendering quality. Such compression makes it feasible for a computing system, such as, a personal computing system described hereinafter with reference to FIG. 2, to store compressed COM data 109. Compressed COM data 109 can also be transported as a bitstream over one or more communication services.

Decompression engine 111 receives and/or otherwise accesses compressed COM data 109. Decompression engine 111 operates in a selective manner in response to access information from rendering engine 113. The access information identifies portions of the compressed COM data in need of decompression and subsequent rendering.

As such, there is no need to decompress the entire mosaic data during the rendering stage. At any time, only a specified view of the concentric mosaic scene is rendered, which requires the accessing of only a portion of compressed COM data 109 depending on such parameters as the location of the viewpoint, viewing direction and the field of view.

Accordingly, rendering engine 113 sends the requisite access information to decompression engine 111, which first looks for the decompressed COM data in a local cache 115. If the required COM data is already available in local cache 115, then the required decompressed COM data is returned to the rendering engine immediately. Otherwise, decompression engine 111 accesses and decompresses portions of the stored compressed COM data 109 not already in cache 115, as required. The newly decompressed COM data is stored in cache 115.

The requested view data having been cached is then processed by rendering engine 113 based on the timing of the interactions between decompression engine 111 and rendering engine 113. In this manner, rendering engine 113 essentially builds a 2D image of the 3D scene for the desired or selected view and displays the view through a monitor 247 (see FIG. 2) or the like.

Computing Environment

Figure 2:
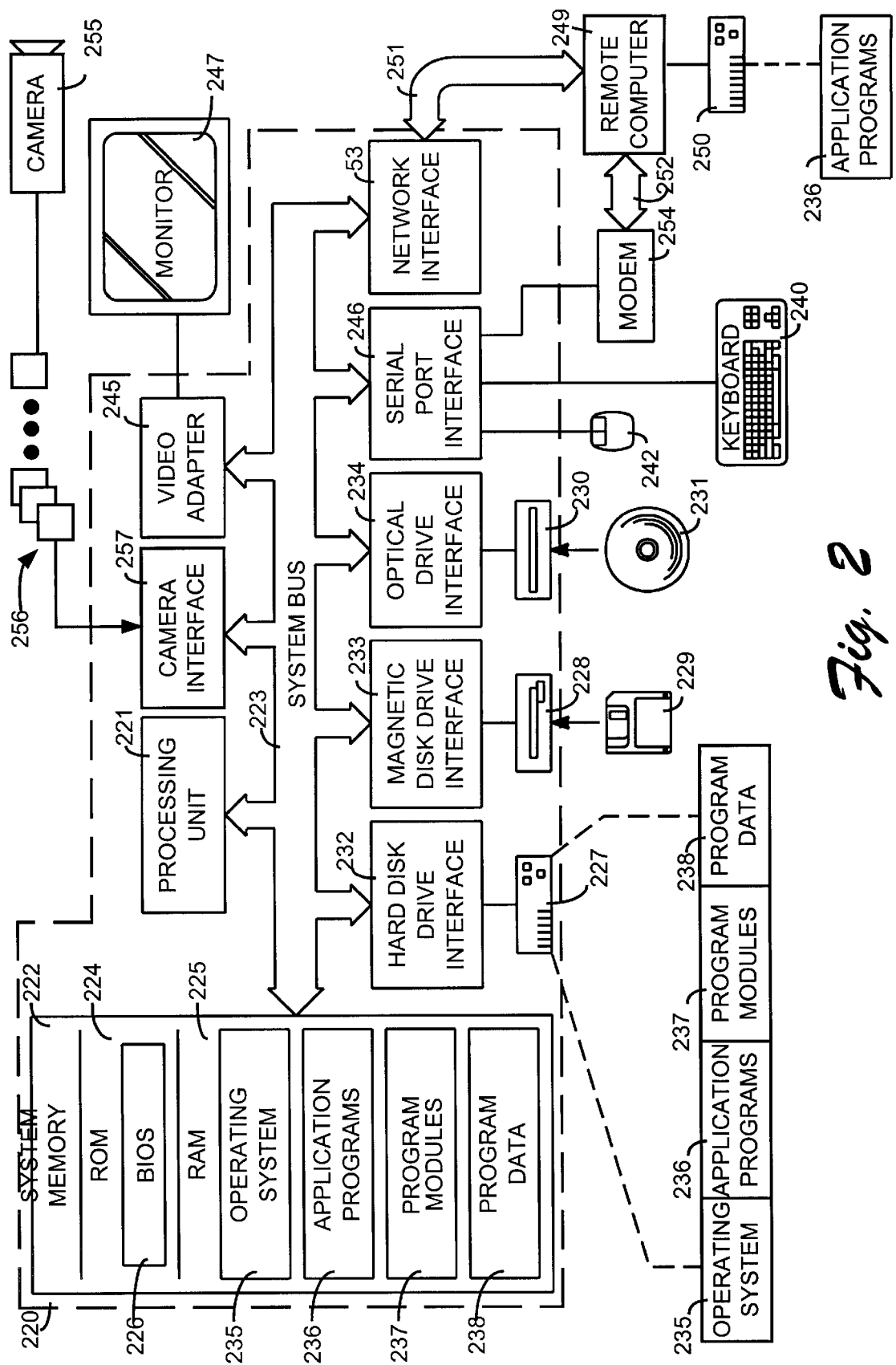
FIG. 2 is a block diagram depicting an exemplary computing system environment suitable for use with the arrangement of FIG. 1.

Reference is now made to FIG. 2, which is a block diagram of an exemplary computing system 200 suitable for use with the arrangement of FIG. 1.

Computing system 200 is, in this example, a personal computer (PC), however, in other examples computing system may take the form of a special-purpose device, an appliance, a handheld computing device, a cellular telephone device, a pager device, etc. Moreover, the arrangement in FIG. 1 can be distributed between a plurality of computers/devices.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). Of particular significance to the present invention, a camera 255 (such as a digital/electronic still or video camera, or film/photographic scanner) capable of capturing a sequence of images 256 can also be included as an input device to computing system 200. The images 256 are input into computing system 200 via an appropriate camera interface 257. This interface 257 is connected to the system bus 223, thereby allowing image data to be stored in RAM 225, or one of the other data storage devices. It is noted, however, that image data, such as COM data, can be input into computing system 200 from any of the aforementioned computer-readable media as well, without requiring the use of the camera 255.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

The Concentric Mosaic Scene

Figure 5A:
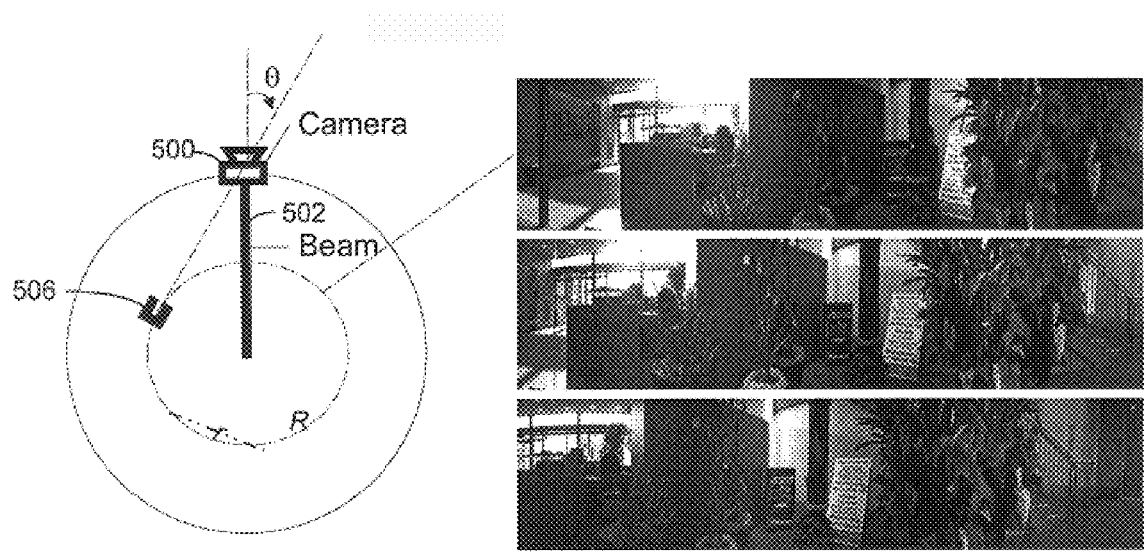
FIGS. 5(a–b) are graphic representations illustrating conventional techniques for generating IBR data as concentric mosaic images.
Figure 5B:
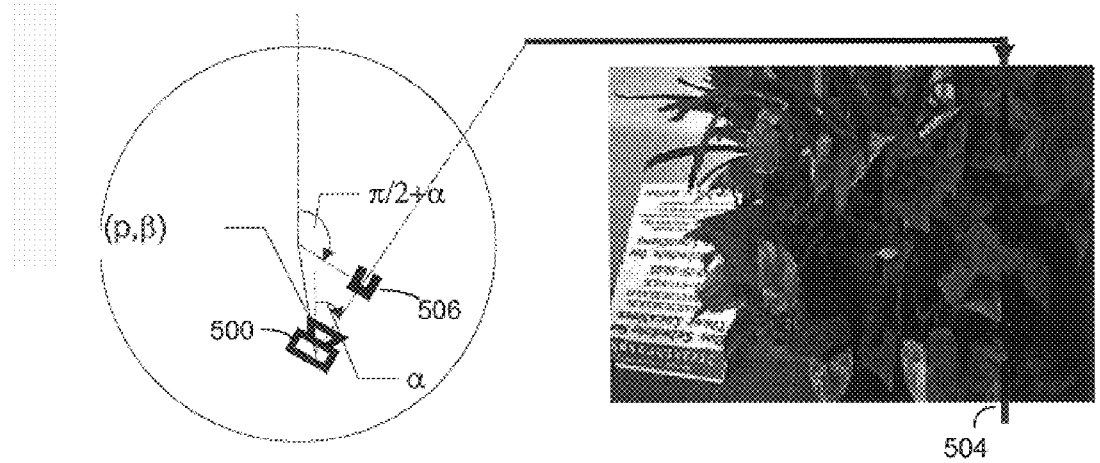

As depicted in FIGS. 5(*a–b*), a concentric mosaic (COM) scene can be obtained by mounting a single camera 500 at the end of a beam 502, and shooting images at regular intervals as the beam rotates. Here, the camera shots taken during the rotation be denoted as c(n,w,h), where n indexes the camera shot, w indexes the horizontal position within a shot, and h indexes the vertical position. Let assume that N is the total number of camera shots, and W and H are the horizontal and vertical resolution of each camera shot, respectively. In the COM scene, the original image data are rearranged into mosaic images, where the mosaic image F(w)={f(w,n,h)|n,h} consists of vertical slits 504 at position w of all camera shots. Consequently, image F(w) can be considered as taken by a virtual slit camera 506 rotating along a circle co-centered with the original beam with a radius r=Rsinθ, where R is the radius of the rotating beam, r is the equivalent radius of virtual slit camera 506, and θ is the angle between ray w and the camera normal. Since images F(w) are a set of concentric mosaic images with different radius, the scene representation is termed concentric mosaic. FIG. 5(*a*) includes three exemplary concentric mosaic images for an office space taken from progressively different positions.

Let the horizontal field of view of the camera be FOV, the COM representation can render any view pointing to any direction within the circle R·sin(FOV/2), as shown in FIG. 5(*b*). Let (p,β) be the location of a new view point in polar coordinates, let the view be separated into a set of vertical slits, with one slit pointing to the direction of α. Using elementary geometry, one can show that the viewing slit is equivalent to a slit on the concentric mosaic circle with radius p·sin(β−α) and angular coordinate (π/2+α). The process is shown in FIGS. 5(*a–b*). By collecting multiple ray slits of the new view in the above way, the rendered image can be shown.

Thus, by recording all the mosaic images F(w), one can equivalently recreate a dense 3D walkthrough view (the COM scene) within the circle R·sin(FOV/2). A single mosaic image F(W/2) provides the center panorama of the scene which enables the viewer to rotate at the center of the camera's track. The remaining mosaic images then supply the additional information required for rendering the 3D walkthrough.

Since the original data of the COM scene is three-dimensional, with strong correlation among different mosaic images, a 3D wavelet scheme is provided for the compression of the COM scene.

COM scene compression includes an alignment process, a 3D wavelet transform process, a scalar quantizer/ embedded block coder process, and a bitstream assembler process, each of which is described in greater detail in subsequent sections.

Figure 3:
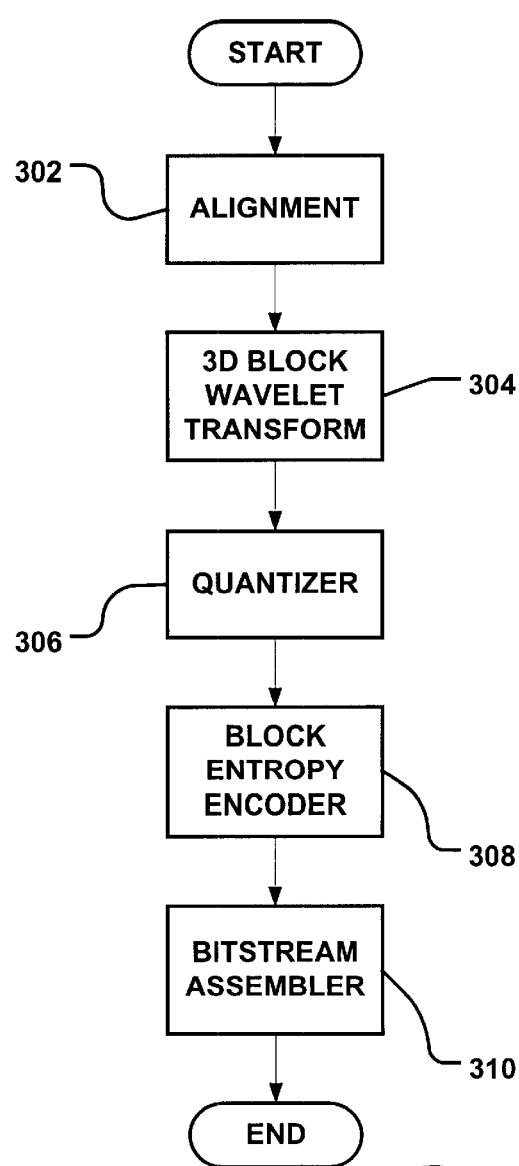
FIG. 3 is a block diagram depicting an exemplary compression engine as in FIG. 1.

These processes are depicted in FIG. 3, which illustrates an exemplary method for use in compression engine 107, as in FIG. 1. Here, the logical operations performed by the compression engine include an alignment step 302, a 3D wavelet transform step 304, a quantizer step 306, a block entropy encoder step 308, and a bitstream assembler step 310.

Alignment Process

Figure 6:
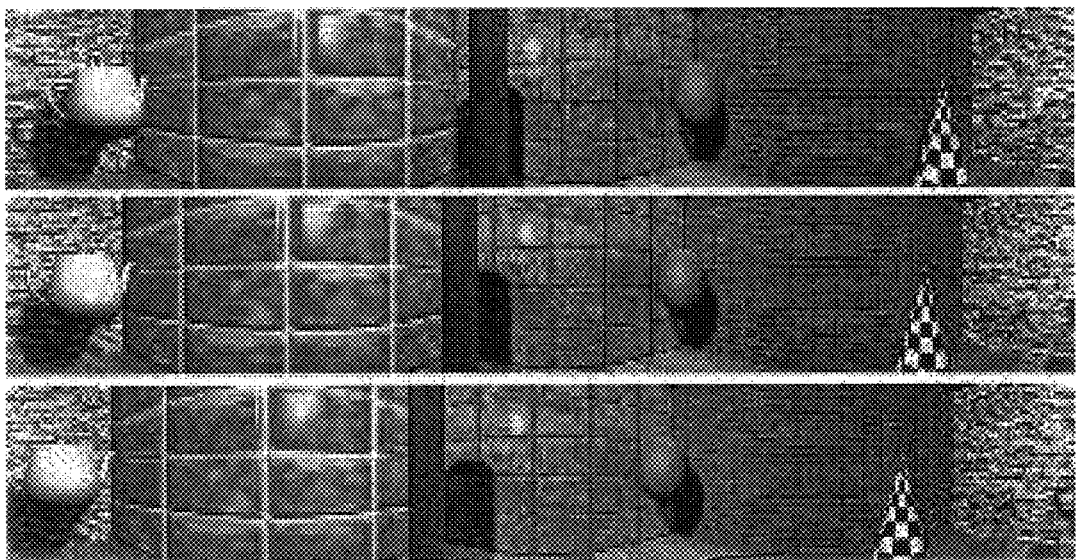
FIG. 6 depicts a set of three (unaligned) concentric mosaic images of an IBR scene.
Figure 7:
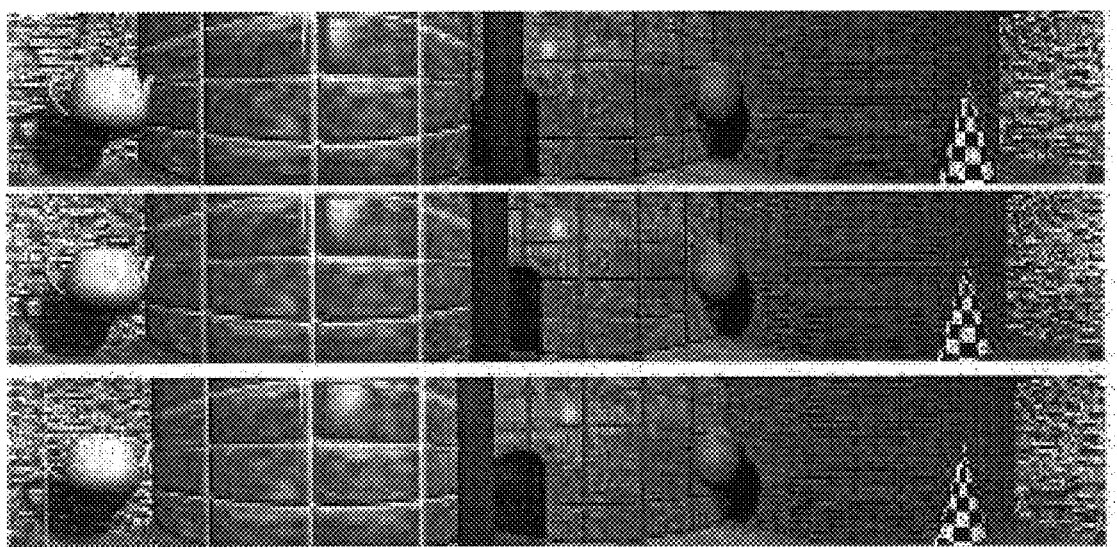
FIG. 7 depicts the concentric mosaic images of FIG. 6 following an alignment process.

The purpose of the alignment step 302 is to maximize the correlation (similarity) along the radial axis by rotating each mosaic image, as required. Examples of unaligned mosaic images 602 and aligned mosaic images 604 are depicted in FIGS. 6 and 7, respectively.

Alignment step 302 may be performed implicitly by considering only the capturing process. Alternatively, alignment step 302 may be performed explicitly by rotationally matching two adjacent mosaic images.

An implicit matching operation takes into consideration that parallel ray slits of a faraway object appear similar. Thus, a mosaic image is aligned: g(n, m, y)=f(n, m−Δ(n), y), where all rays g(*, m, y) point to the same direction. The alignment factor Δ(n) can be calculated as:

$$\Delta(n) = \frac{A}{2\pi} \arctan\left[\frac{2(n - W/2)}{W} \tan\frac{FOV}{2}\right]$$

The resulting alignment factor Δ(n) is recorded in the compressed bitstream.

An explicit matching operation actually compares consecutive mosaic images and reduces the mean absolute error (MAE) or the mean square error (MSE) between the two rotationally shifted mosaic images:

$$MAE(n) = \sum_{m=1}^{A} \sum_{y=1}^{H} |f(n, m - \Delta(n), y) - f(n-1, m - \Delta(n-1), y)|$$

$$MSE(n) = \sum_{m=1}^{A} \sum_{y=1}^{H} [f(n, m - \Delta(n), y) - f(n-1, m - \Delta(n-1), y)]^2$$

where f(n,m−Δ(n),y) is the shifted mosaic image n. The consecutive displacement Δ(n)−Δ(n−1) that minimizes the MAE or MSE is the relative alignment factor between mosaic images. By setting the alignment of a specific mosaic image to zero, e.g., that of the $0^{th}$ mosaic image $\Delta(0)=0$, we may derive the absolute alignment factor of the other mosaic images. The resulting alignment factor $\Delta(n)$ is again recorded in the compressed bitstream. Current experimental results tend to show that the compression performance of explicit alignment outperforms that of implicit alignment.

Figure 8:
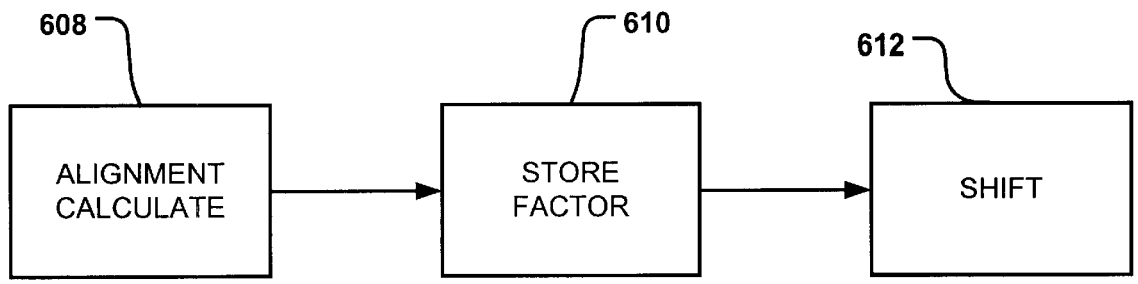
FIG. 8 is a block diagram depicting an exemplary alignment operation.

An exemplary explicit alignment step 302 is also depicted in FIG. 8 as having an alignment calculate function 608 that implements one or more of the above operations or an equivalent alignment/matching operation to determine an alignment factor $\Delta(n)$, a store factor function 610 that records the alignment factor $\Delta(n)$ in the compressed bitstream, and a shift function 612 that shifts the mosaic image f(n, m, y) by the alignment factor, such that the aligned mosaic image g(n, m, y) becomes g(n, m, y)=f(n, m−$\Delta(n)$ ,y), wherein f( ) and g( ) are the concentric mosaic image before and after alignment operation, respectively. Here, shift function 612 uses n to index the radius axis, i.e., the mosaic image, m to index the angular axis, and y to index the height axis.

3D Wavelet Transform Process

In step 304, a 3D separable wavelet transform is applied on the concentric mosaic (COM) image array to de-correlate the images in all three dimensions, and to compact the energy of the image array into a few large coefficients. In addition to energy compaction, the multi-resolution structure provided by the 3D wavelet transform may also be used to access a reduced resolution mosaic image array during rendering. This is useful when there is not enough bandwidth or computation power to access the full resolution of the COM scene, or the display resolution of the client device is low.

The entire COM scene will likely be too large to be loaded into memory simultaneously to perform the 3D wavelet transform. Therefore, for the sake of memory saving and computational simplicity, a 3D lifting scheme with a frame/line buffer can be implemented.

Figure 9:
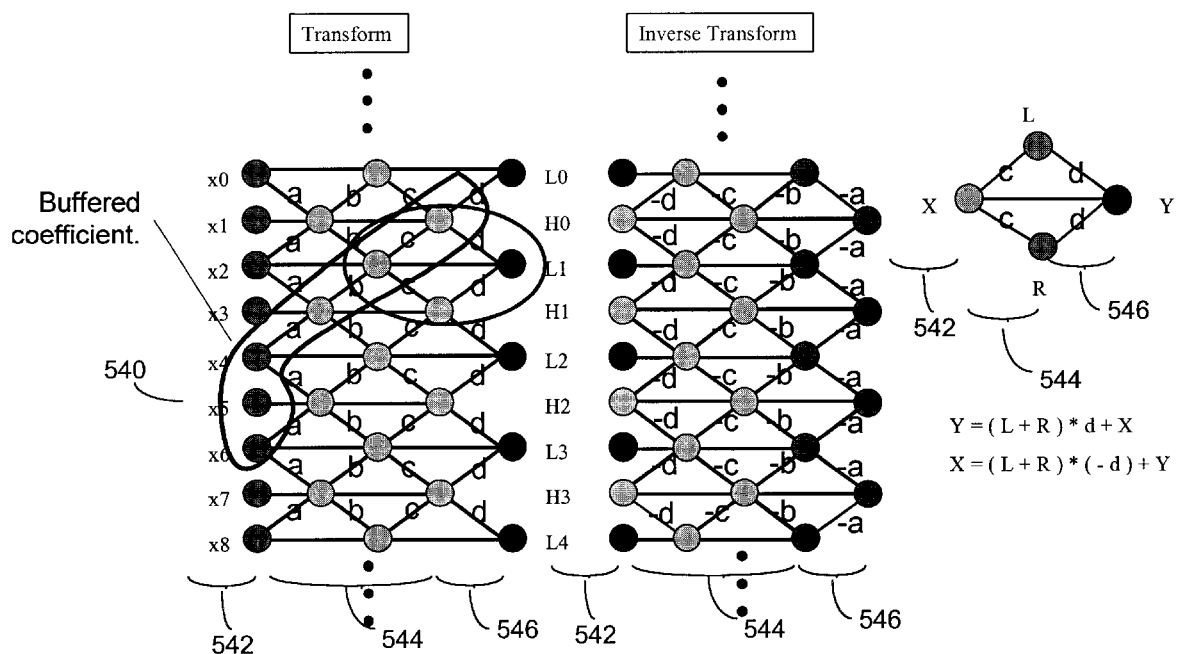
FIG. 9 is a pictorial representation of a forward wavelet transform, and an inverse wavelet transform.

By way of example, a sample one-dimension bi-orthogonal 9-7 lifting wavelet is illustrated in FIG. 9. Corresponding to the three dimensions, there are three different lifting operations, namely, frame lifting, line lifting and horizontal lifting. The original COM data are provided one element at a time, where a single element is one mosaic image for the frame lifting, one line for the line lifting, or a single pixel for the horizontal lifting. The 4 stage forward lifting, shown in the left side of FIG. 9, can be formulated as follows:

$$\begin{cases} y_1(2i+1) = x(2i+1) + a[x(2i) + x(2i+2)] \\ y_2(2i) = x(2i) + b[y_1(2i-1) + y_1(2i+1)] \\ h(i) = y_3(2i+1) = y_1(2i+1) + c[y_2(2i) + y_2(2i+2)] \\ l(i) = y_4(2i) = y_2(2i) + d[y_3(2i-1) + y_3(2i+1)] \end{cases}$$

where x(i) is the original data, $y_s(i)$ is the sth stage lifting, h(i) and l(i) are the high and low pass coefficients, respectively. The coefficients of the 9-7 biorthogonal lifting are a=−1.586, b=−0.052, c=0.883 and d=0.444. The elementary operation of lifting is Y=(L+R)*d+X, which is depicted in the right side of FIG. 9. Since the elementary operation can be easily inversed as X=Y−(L+R)*d, the inverse of the lifting can be easily derived, as shown in the middle of FIG. 9.

In this example, the elementary operation of the lifting consists of 2 additions and 1 multiplication operation. The average computation load is thus 4 additions and 2 multiplications per coefficient. In contrast, the average computation of the traditional convolution implementation of the same 9-7 biorthogonal wavelet is 8 additions and 4.5 multiplications, which more than doubles the computation load. The original data X is no longer needed once the coefficient Y is calculated; therefore, the result Y may be stored at the same memory unit that holds X. Such in-place calculation may be used to reduce the memory required for the lifting operation. In fact, in the 9-7 biorthogonal lifting, only 6 elements need to be buffered. Shown in circle 540 of FIG. 9, three elements are selected from intermediate results 544 of the lifting, and the other three elements are selected from original coefficients 542.

Thus, for every two input data points, four elementary lifting operations are performed and one low pass and one high pass coefficients are output. The required memory buffer to perform the 3D lifting is thus 6 frames for the frame lifting, and 6 lines for the line lifting.

Figure 10:
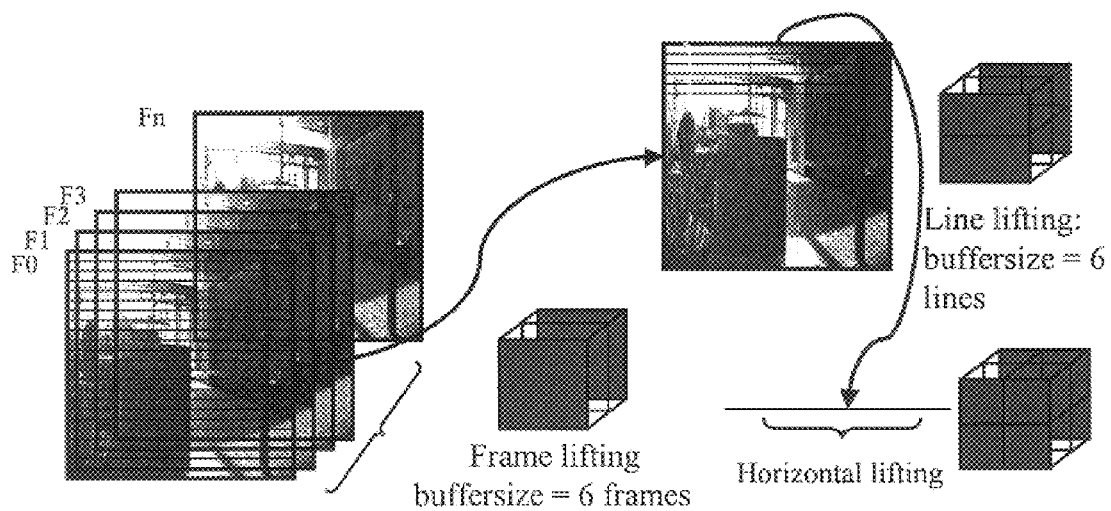
FIG. 10 is an illustrative representation of a single scale three-dimension lifting process.

An exemplary single scale 3D lifting is further illustrated in FIG. 10, where frame lifting is performed first, then line lifting, followed by horizontal lifting.

Figure 11:
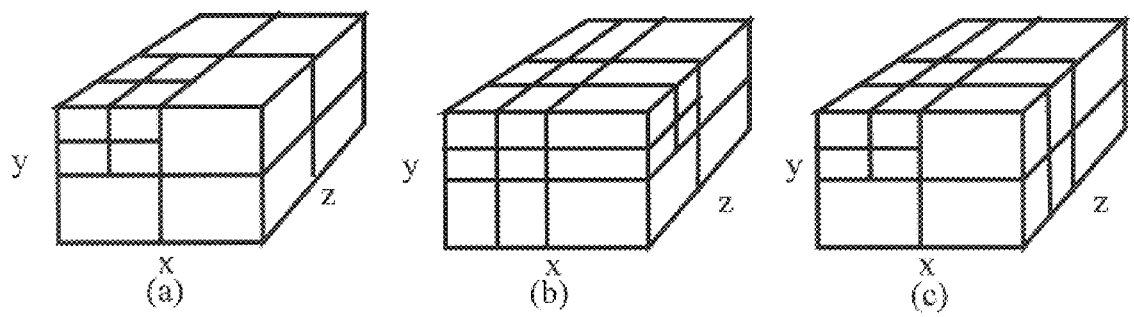
FIGS. 11(a–c) are illustrative representations of multiple scale 3D lifting processes.

In the COM scene coding, more than one single scale lifting operation is usually performed, thus some of the resulting wavelet subbands may be further decomposed. For example, one may choose to decompose only the low pass band of the frame, line and horizontal lifting, such decomposition being called the mallat decomposition. Two-level full mallat decomposition is depicted in FIG. 11(*a*), for example, where the lifting along the x, y and z axes is the frame, line and horizontal lifting, respectively. Alternatively, one may first perform wavelet decomposition along one axis, and then decompose the plane spanned by the other two axes. For example, as shown in FIG. 11(*b*), one may first perform a two-level decomposition along the x axis, and then a two-level full mallat decomposition on the (y, z) plane. Another lifting configuration shown in FIG. 11(*c*) includes first performing a two-level z axis decomposition followed by a two-level full mallat decomposition on the (x, y) plane. All such decompositions are forms of wavelet packet, and the adopted wavelet packet structure will be recorded in the compressed COM bitstream.

Block Scalar Quantization and Embedded Block Coding

Referring to FIG. 3, the output from wavelet transform step 304 is provided to block quantizer step 306. Block quantizer step 306 causes the wavelet-transformed coefficients to be divided into cubes, compressed by a scalar quantizer and output to embedded block entropy encoder step 308.

In block quantizer step 306, the compressed block bitstreams are first buffered, and then assembled by a rate-distortion optimized assembler after all blocks have been encoded. Even though the quantization and entropy coding are performed on a block-to-block basis, the wavelet transform operates on the entire COM data, therefore, no explicit blocking artifact is visible in the decoded COM scene.

The block coding structure selected for the COM scene compression has several advantages. For example, such a block coding structure can benefit from local statistical variations. The statistical property may not be homogeneous across the entire COM data set. Since each block of coefficients is processed and encoded independently, the encoder may tune to local statistical properties, and thus improve coding performance. The variation of the statistics across the COM scene may also be used in bitstream assembler operation 310, and bits may be distributed in a rate-distortion optimized fashion across the COM scene.

Another advantage of the block coding structure is that it provides for easy random access. A selected portion of the COM scene can be randomly accessed without decoding the entire COM data set, because of the block quantization and entropy coding. From the accessed region required by the rendering unit, one may derive the related blocks using the wavelet basis and wavelet decomposition scheme. Only the bitstreams of the accessed blocks are decoded.

Yet another advantage of the block coding structure is its relatively low memory requirement. The block coding structure eliminates the need to buffer the entire volume of COM coefficients. Only K frames of coefficients need to be buffered for each subband, where K is the size of the block in frame direction. Once K frames of coefficients have arrived, they are divided into block, quantized and entropy encoded. There is still a need to buffer the compressed bitstream of coefficients, however, doing so does not require too much memory. Moreover, the decoder side (shown in FIG. 4) requires even less memory since the compressed bitstream is only partially accessed and decoding is only performed on those blocks required to render the current view.

With these advantages and others in mind, block quantizer step 306 can be a simple quantizer with step Q and a dead zone 2Q. The forward and inverse quantizer can be formularized as:

$$q = \begin{cases} \lfloor w/Q \rfloor & w > 0 \\ 0 & w = 0 \\ \lceil w/Q \rceil & w < 0 \end{cases} \quad w' = \begin{cases} (q+0.5)Q & q > 0 \\ 0 & q = 0 \\ (q-0.5)Q & q < 0 \end{cases}$$

where w and w' are the original and reconstructed coefficients, q is the quantizer output, $\lfloor x \rfloor$ and $\lceil x \rceil$ are the floor and ceiling functions, respectively. Since bitstream assembler step 310 is used, the quantization step size Q no longer controls the final coding quality. Consequently, one may simply choose a small constant quantization step size Q, such as Q=1.0 to ensure that the COM scene is compressed with sufficient quality before assembling. Depending upon the implementation of the quantizer, Q may be less than 1.0 or greater than 1.0. For example, certain implementations require good compression performance uses Q=0.125.

Many implementations of the entropy encoder are feasible. Due to the use of the bitstream assembler, the entropy coder should provide an embedding property, such that the compressed block bitstream can be truncated at a later stage with a good compression performance at such reduced bit rates.

With this in mind, three different exemplary embedded entropy coders are described herein, each having different complexity and performance tradeoffs. These entropy encoders are all bitplane coders.

Let the block under consideration be denoted by C, let b(i,l) be the ith most significant bit of the absolute value of coefficient i. Let $B_l$ be the lth bit plane, which consists of all bits at the same significance level l. Let L be the total number of bitplanes, where it is satisfied that for all coefficients x in C, $|x|<2^L$, and there is at least one coefficient x so that $|x|>=2^{L-1}$.

All three exemplary entropy encoders encode the block bitplane by bitplane, and all iterate from the most significant bitplane L−1 to the least significant bitplane 0. Thus, if the compressed bitstream is truncated later, at least the most significant bitplanes of all coefficients are accessible, and the block can still be decoded with fair quality.

For each coefficient $x_i$ at a certain bitplane k, if all bits in prior bitplanes are 0, i.e., b(i,l)=0 for all l>k, the coefficient is deemed insignificant. Conversely, for each coefficient $x_i$ at a certain bitplane k, if one of the bits in prior bitplanes are 1, i.e., exist l>k so that b(i,l)=1, the coefficient is deemed significant.

For each bitplane, the bits of insignificant coefficients are encoded in significance identification mode, while the bits of significant coefficients are encoded in refinement mode. The bit in the refinement mode appears uniformly as 0 or 1, and hence leaves less room for compression.

Due to the energy compaction property of wavelet transform, the bit in the significance identification mode skews highly toward 0, therefore, it is the task of significance identification to locate the coefficient which turns significant in a current bitplane, i.e., those bits that satisfy b(i,k)=1 and b(i,l)=0 for all l>k.

As will be seen, the three exemplary entropy encoders described below differ primarily in how the significance identification is performed.

During the embedded coding, the coding rate R(l) and distortion D(l) of the block are recorded at the end of each bitplane. The rate R(l) can be easily derived from current encoding bitstream length. The distortion D(l) may be calculated by measuring the difference between the original and reconstructed coefficients at the current stage.

A look-up table, such as, for example, as the one presented in the Verification model ad-hoc, "JPEG 2000 verification model 5.0", ISO/IEC JTC1/SC29/WG1/N1420, October 1999 (which is incorporated herein by reference) may be used to speed up the distortion calculation.

Alternatively, one may estimate the distortion D(l) with technology presented in the rate-distortion optimized embedded coder (RDE) described in J. Li and S. Lei, "An embedded still image coder with rate-distortion optimization", *IEEE Trans. On Image Processing*, Vol. 8, No. 7, pp.913–924, July 1999 (which is incorporated herein by reference).

Calculating distortion D(l) is of course more accurate and is beneficial for the coding performance, however, the estimation of the distortion D(l) tends to be significantly faster and introduce less overhead.

However determined, the recorded rate-distortion performance of the block will be used in the bitstream assembler.

The three exemplary block entropy encoders will now be described in more detail.

Tree Coder

The first exemplary block entropy encoder is a tree coder. Here, the insignificant coefficients are grouped by oct-tree, while the significant coefficients are split into individual pixels. Tree coding is efficient because large areas of insignificant bits are grouped together and represented with a single '0'. As the encoder iterates from the most significant bitplane to the least significant bitplane, the oct-tree of insignificant coefficients gradually split and the locations of the significant coefficients are identified.

The procedure of the tree coder is as follows:

Step 1. Initialization

Figure 12:
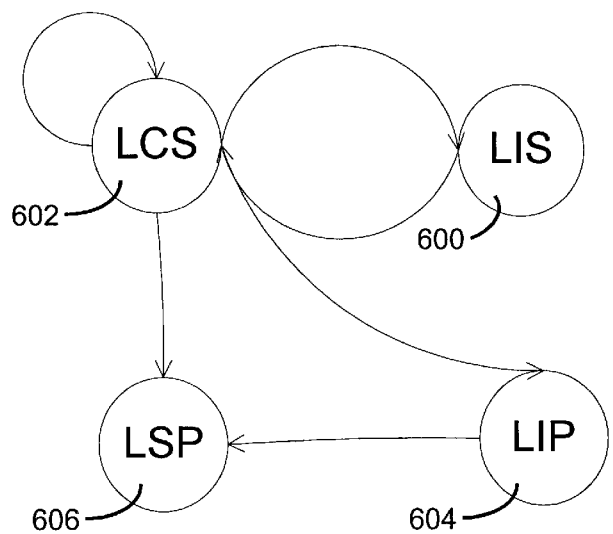
FIG. 12 is a state-transition diagram depicting a tree block entropy coder.

Four lists are established: a list of insignificant sets (LIS) 600, a list of candidate sets (LCS) 602, a list of insignificant pixels (LIP) 604, and a list of significant pixels (LSP) 606 (see FIG. 12). LIS 600 includes sets where all coefficients are insignificant. LCS 602 includes sets where all coefficients are insignificant but at least one coefficient will be significant in this bitplane. LIP 604 includes single insignificant coefficients. LSP 606 includes single significant coefficients. The elements in these four lists may move according to the diagram depicted in FIG. 12. Thus, for example, elements in LCS 602 may split and move to LIS 600, LSP 606, LIP 604 or from another element of LCS 602. However, an element in LIS 600 can only move to LCS 602. Similarly, an element in LIP 604 is only permitted to move to LSP 606. Once an element moves to LSP 606 is remains there.

Step 2. Bitplane coding.

In each bitplane coding, we first examine sets in LIS 600 one by one. If at least one coefficient becomes significant in this bitplane, a '1' is encoded and the set moves to LCS 602. Otherwise, a '0' is encoded and the set remains in LIS 600. Then the sets in LCS 602 are examined. For a set c in LCS 602, since it is guaranteed that at least one coefficient will become significant in this bitplane, the set splits along the three axes into 8 sub-sets: $c_1, \ldots, c_8$. If set c is of size 2>2×2, 8 child pixels are generated. For each subset/pixel $c_i$, a status bit $s_i$ is established and set to '0' if the subset/pixel is insignificant, or to '1' otherwise. The 8-bit status string $s=\{s_1, \ldots, s_8\}$ is Huffman encoded. The subset/pixel $c_i$ is placed into LCS/LSP if the status bit is '1', and into LIS/LIP if the status bit is '0'. If pixel $c_i$ moves into LSP 606, its sign is encoded. After all sets in LCS 602 have been processed, all coefficients in LIP 604 in the beginning of current bitplane coding are examined. If the coefficient becomes significant, a '1' is encoded followed by the sign of the coefficient, and the coefficient moves to LSP 606. Otherwise, a '0' is encoded. Finally, all coefficients in LSP 606 in the beginning of current bitplane coding are refined.

Although conceptually the tree coder encodes the block bitplane by bitplane, in certain actual implementations, the tree is built for the coefficient block and all subsequent examination is performed on that tree. As such, it appears that the computational complexity of the tree coder is thus the lowest among the three exemplary entropy encoders.

Golomb-Rice (GR) Coder

A GR coder identifies the significant coefficient with an adaptive binary Golomb-Rice (ABGR) coder, which is a simplified run-length coder. More details of the ABGR coder can be found in E. Ordentlich, M. Weinberger, and G. Seroussi, "A low-complexity modeling approach for embedded coding of wavelet coefficients", *Data Compression Conference (DCC'98)*, Salt Lake City, Utah, March 1998 (which is incorporated by reference herein).

For better compression performance, the insignificant coefficients are further classified into two categories, i.e., a predicted significant bits where at least one of the 26 nearest neighbors are significant, and a predicted insignificant bit where all the 26 neighbors are insignificant. Thus, in each bitplane coding, we encode the predicted significant bits, then the predicted insignificant bits, and finally the refinement bits. Such coding order can be empirically determined by the rate-distortion property of different bit sets.

As a result, we scan the coefficient block three times, each time with a serpentine scanning order that alternates between left-to-right and right-to-left visiting of a row of coefficients. The predicted significant and insignificant bits are encoded by independent ABGR coders with separate parameters. The refinement bits are not encoded and are just sent directly to the block bitstream. The ABGR coder is used to encode the run to the next coefficient that will become significant in a predicted significant or an insignificant scan. If the run is greater than or equal to $2^m$, a '0' is encoded to represent a zero run of $2^m$, while the rest of the run is further examined. Otherwise, a bit '1' is encoded followed by m bits of the binary representation of the run length and the sign of the significant coefficient.

In essence, the ABGR coder is a Huffman coder that assigns 1 bit for a run greater than or equal to $2^m$, and m+1 bits for a run smaller than $2^m$. Here, m is an adaptive parameter in the ABGR coder, and can be determined by a state transition table, for example, as specified in JPEG-LS AHG, "JPEG-LS part 2 CD version 1.0", ISO/IEC JTC1/SC29/WG1N1557, Maui, Hawaii, December 1999 (which is incorporated by reference herein).

Context-Based Arithmetic Coder

The third exemplary block entropy encoder is a context-based arithmetic coder that in certain ways resembles the GR coder described above. Here, the block is still encoded by bitplanes, and each bitplane is still scanned three times, as predicted significance, predicted insignificance and refinement. However, in the predicted significant and predicted insignificant scan, the insignificant bit is encoded with an arithmetic coder using a context derived from the 26 significant statuses of the neighbors of current coefficient. The 26 significant statuses are grouped into categories so that the number of context is reduced to avoid context dilution. The technique bears resemblance to the one used in Verification model ad-hoc, "JPEG 2000 verification model 5.0", ISO/IEC JTC1/SC29/WG1/N1420, October 1999 (which is incorporated by reference herein). Experimental results tend to show that this content-based arithmetic coder yields the best compression performance, however, it is also computationally the most expensive since context calculation is relatively time consuming.

Rate-Distortion Optimized Bitstream Assembler

After all the blocks of coefficients have been entropy encoded, the bitstream assembler step 310 of FIG. 3 assembles the bitstream and builds a file structure. The bitstream assembler is essentially used to optimally allocate the bits among different blocks based on the rate-distortion curves of individual blocks obtained during the embedded coding stage. The block distortion is further multiplied by the energy weight of the subband:

$$D_{Weighted}=W \cdot D_{Original}$$

where the subband weight w is the gain (energy) of the lifting synthesis function. For the bi-orthogonal 9-7 filter, the gain for the low pass filter is $w_L=1.299$, and the gain for the high pass filter is $w_H=0.787$. For a wavelet subband with n low pass lifting and m high pass lifting, the energy weight of the subband can be calculated as $w=w_L^n w_H^m$, no matter whether the lifting is performed along the frame, line or horizontal axes.

Figure 21:
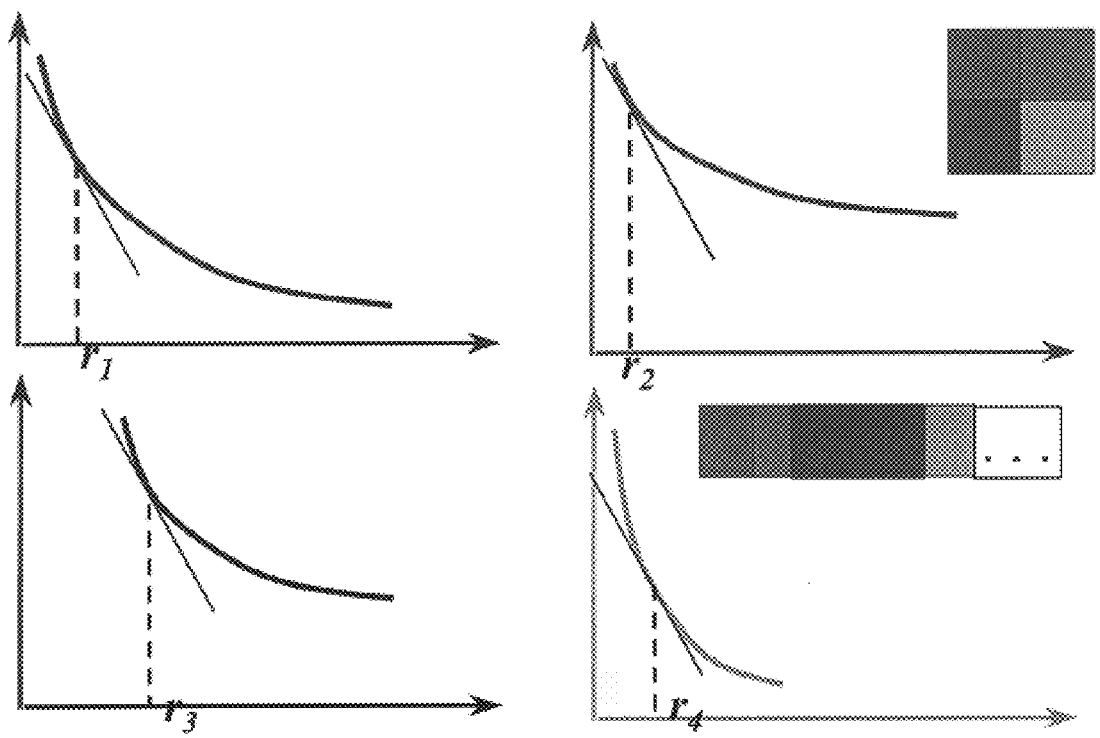
FIG. 21 depicts four graphs demonstratively illustrating one technique for determining an optimal rate-distortion slope that is significantly tangent with the rate-distortion curves of all encoded blocks.

The rate-distortion theory indicates that optimal coding performance can be achieved if all blocks operate on the same rate-distortion curve (e.g., see exemplary curves in the graphs depicted in FIG. 21). The functionality of the bitstream assembler is thus to find the common rate-distortion slope of all blocks, and calculate the included bits for each block. The two functionalities are performed below:

The first step is to find the truncation bit rate for each block. Here, given a rate-distortion slope, the coding rate of each block can be determined by the portion of the bitstream with operating rate-distortion slope greater than the given slope. In essence, we find the tangent on the rate-distortion curve of the block that is equal to the given rate-distortion slope, and the operating bit rate at this tangent point is the coding bitrate for this block. This is graphically illustrated in the exemplary graphs shown in FIG. 21.

The next step is to find the optimal common rate-distortion slope. Here, the optimal common rate-distortion slope can be found through a bi-section method. We first set two rate-distortion slope threshold $\lambda_{min}$ and $\lambda_{max}$, where the optimal rate-distortion slope is enclosed in the interval ($\lambda_{min}$, $\lambda_{max}$). A current threshold $\lambda=(\lambda_{min}+\lambda_{max})/2$ is then calculated. Given current threshold $\lambda$, each block is examined and the operating bitrate is calculated. The current coding rate is the sum of the coding rate of all blocks. Depending on whether the current coding rate is larger or smaller than the desired rate, the lower or upper limit of the threshold is updated accordingly. The search stops after a significant number of iterations, or, for example, as long as the current coding rate is significantly close to the desired rate. During the search of the optimal coding rate, only the rate-distortion function of each block is examined, no block needs to be re-encoded. Therefore, the search can be performed relatively quickly.

The process is illustrated in the graphs depicted in FIG. 21. Here, a scene consists of 4 blocks. The weighted rate-distortion curve of each block is calculated during the embedded coding stage. The bitstream assembler searches for an optimal rate-distortion slope that is tangent with the rate-distortion curves of all blocks. The block bitstream is then truncated at the tangent point, and the truncated bitstream segments of different blocks are assembled together to form the compressed bitstream. The rate-distortion slope is adjusted so that output bitrate is equal or close to the desired bitrate.

By way of further example, the rate-distortion optimization theory presented in RDE [J. Li and S. Lei, "An embedded still image coder with rate-distortion optimization", IEEE Trans. On Image Processing, Vol. 8, No. 7, pp.913–924, July 1999] works as follows:

Step 1. Let all blocks of subband be enumerated with index j. Let $R_{Total}$ be the desired coding length of the compressed mosaic scene. Let there be a weight associated with each block, which is the same for all blocks within a subband, and is calculated based on the wavelet decomposition of the subband. As an example, a resolution 2 subband with first layer decomposition LLL, and second layer decomposition HLH has a weighting factor $w=w_L^4 w_H^2$.

Step 2. For block j with n(j) layers, its rate-distortion slope at each layer l is calculated as:

$$S(j, l) = -w(j) \cdot \frac{D(j, l-1) - D(j, l)}{R(j, l) - R(j, l-1)}.$$

If there is an irregular slope point l with $S(j,l)<S(j,l+1)$, it will be removed, and the slope at layer l+1 will be recalculated as:

$$S(j, l+1) = -w(j) \cdot \frac{D(j, l-1) - D(j, l+1)}{R(j, l+1) - R(j, l-1)}.$$

This irregular slope point removal process repeats until the rate-distortion curve of each block becomes convex, and the rate-distortion slope of each block becomes strictly decreasing.

Step. 3. A rate-distortion threshold A is determined for all blocks. Through the rate-distortion threshold $\lambda$, the truncation point $l(j, \lambda)$ of block j is determined by equation:

$$S(j,l(j,\lambda))>\lambda>S(j,l(j,\lambda)+1),$$

and the corresponding coding rate is $R(j,l(j,\lambda))$. The total number of bits of the compressed concentric mosaic scene is thus:

$$R_{REAL}(\lambda) = \sum_j R(j, l(j, \lambda))$$

The threshold $\lambda$ is tuned so that $R_{REAL}(\lambda)$ is only a little smaller than $R_{Total}$, the tuning process can be achieved through a bi-section algorithm.

The second functionality of the bitstream assembler is to assemble the compressed concentric mosaic bitstream. For bitstream random access, an index table or other form of identifying information can be encoded, which records the encoded bitstream length of each individual block, i.e., $R(j,l(j,\lambda))$. The index table and the compressed bitstream of each block coefficients form the compressed concentric mosaic scene.

Decompression and Rendering Operations

Figure 4:
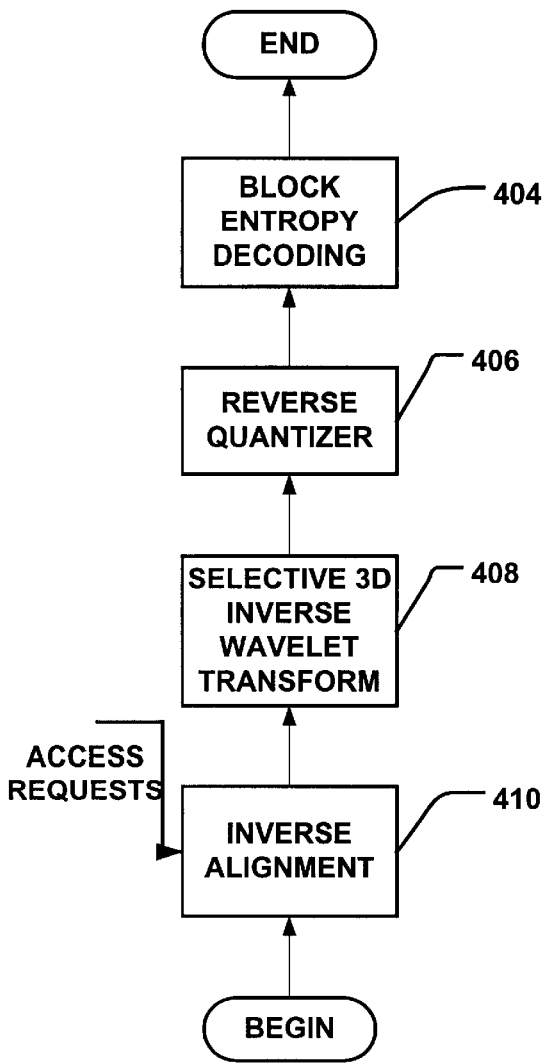
FIG. 4 is a block diagram depicting an exemplary selective decompression engine as in FIG. 1.

As shown in FIG. 4, the decompression and rendering operations are substantially procedurally opposite to the capture and compression operations depicted in FIG. 3.

Here, the desired or new view is split into a number of columns, and for each column, a corresponding column in the concentric mosaic scene is found. If, for example, bilinear interpolation is used, then as many as four columns may be accessed, and the new column bilinearly interpolated from the four accessed columns.

An exemplary rendering operation is described in the above-referenced application entitled "Rendering With Concentric Mosaics." While one may decompress the concentric mosaic bitstream and then render it, this tends to require a significant amount of memory. Moreover, the rendering system will likely experience a fairly lengthy start delay to decompress the compressed concentric mosaic bitstream. Hence, a better implementation is to combine a selective decompression operation with the rendering operation. A number of column access requests $f(n_i,m_i,y)$, with i=1, . . . ,k are sent by the rendering engine 113 (FIG. 1) to the selective decompression engine 111 (FIG. 1). It is the task of the selective decompression engine 111 to provide the rendering engine 113 with the accessed columns.

FIG. 4 illustrates the logical operations of selective decompression engine 111 in FIG. 1. The operational flow for the selective decompression begins with the inverse alignment 410. With the recorded alignment factor $\Delta(n)$, an accessed mosaic image column $f(n_i,m_i,y)$ is converted into the aligned column $g(n_i,m_i+\Delta(n_i),y)$, and the accessed coordinate $n_i,m_i+\Delta(n)$ is sent to the selective 3D inverse wavelet transform engine 408.

The selective 3D inverse wavelet transform 408 converts the compressed 3D wavelet coefficients back to the mosaic images. For a single scale wavelet synthesis, a separate one dimensional wavelet synthesis operation is performed for the radius axis, the angular axis and the height axis. The synthesis operation begins at the lowest resolution scale, and moves gradually to higher resolution scales. Once again a lifting wavelet implementation can be used. The synthesis flow of the bio-orthogonal 9-7 wavelet filter is illustrated in FIG. 9, where the value of coefficients a, b, c and d are exactly the same as that is mentioned in the description of the wavelet analysis operation. At the boundary of the axis, symmetrical extension may be used. For further details of the inverse wavelet lifting, we refer to the published document ISO/IEC JTC1/SC29/WG1N1422, "JPEG 2000 verification model 5.0".

Progressive Inverse Wavelet Synthesis (PIWS) Process

The rendering engine does not need to access all mosaic data anytime during the rendering operation. To render a new or desired view, only some columns of the original mosaic scene are accessed, and therefore only partial wavelet coefficients need to be accessed and synthesized. Inverse decoding and synthesizing all wavelet coefficients and generating the entire concentric mosaic scene is not only computational intensive, but also memory prohibitive.

A progressive inverse wavelet synthesis (PIWS) is therefore implemented such that the data content needed to render the current view is decoded just-in-time, or otherwise managed within a mixed cache to reduce the memory and computation complexity. The decoded coefficients, intermediate results and synthesized mosaic data are cached at the same position.

Figure 13A:
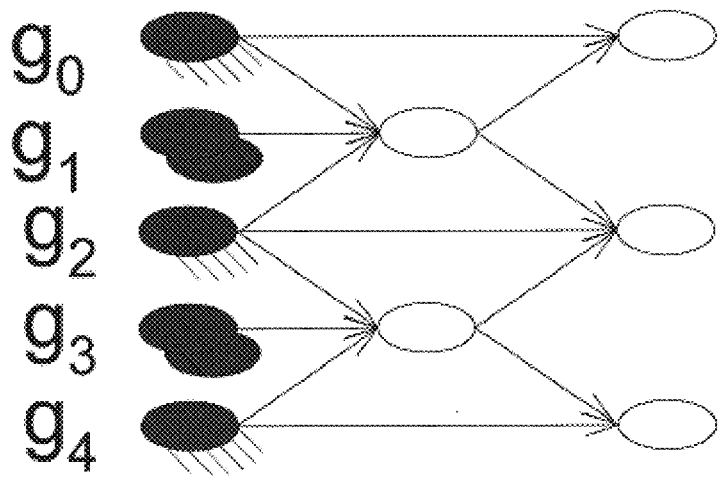
FIGS. 13(a–c) are pictorial sequential representations of a mixing cache containing decoded coefficients, intermediate results and synthesized mosaic data for use with progressive inverse wavelet synthesis (PIWS).
Figure 13B:
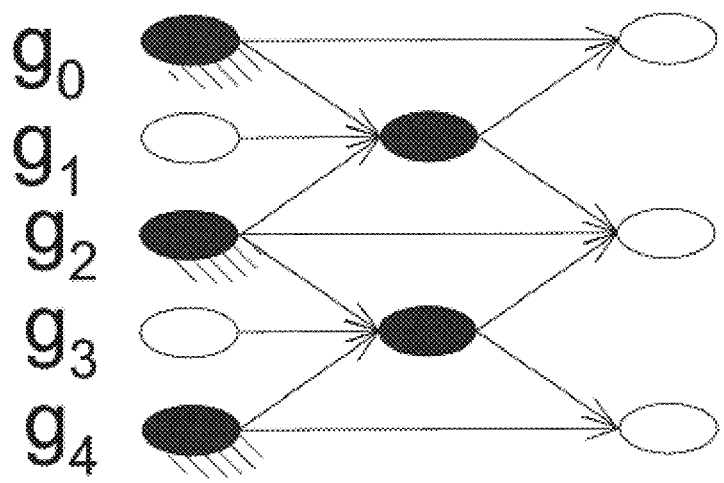
Figure 13C:
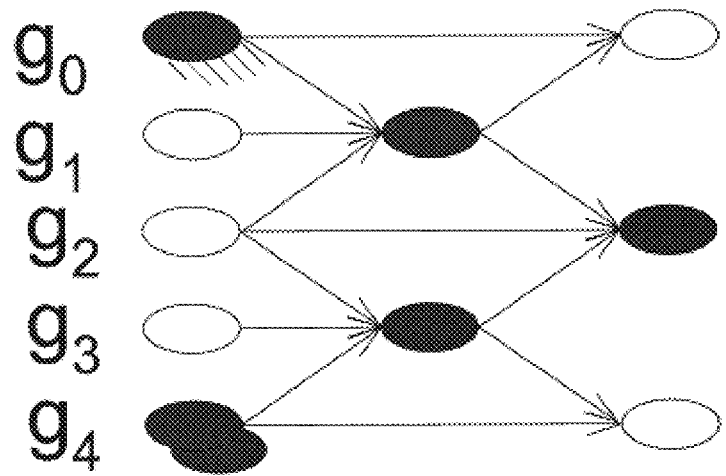

We first graphically depict an exemplary one dimensional PIWS algorithm in FIGS. 13(a–c). Here, each circle represents a column in a one-dimensional inverse lifting operation. At first, in FIG. 13(a), the decoded coefficients occupy positions $g_0$, $g_1$, g2, $g_3$ and $g_4$. Next, the content of position $g_1$ and $g_3$ is updated with a first stage lifting, and the results are shown in FIG. 13(b). The position $g_2$ is then updated with a second stage lifting, and the results are shown in FIG. 13(c). At each instance, content stored in position $g_i$ can be decoded coefficients, intermediate results of lifting, or final results of lifting. They share the same memory storage space, thus reduce the necessary operation RAM. The caching of intermediate results and decoded coefficients speed up the selective decoding process. Before describing certain exemplary PIWS implementations, let us first consider some alternative implementations.

One alternative implementation (direct decoding/access by column approach) would eliminate the cache and instead decode straight from the compressed bitstream. In such a scheme, when a new view of the concentric mosaic is rendered and when the rendering engine calls for the access of a number of columns in the mosaic image array, the bitstream segments corresponding to each accessed column is identified, entropy decoded, inverse quantized and inverse wavelet lifted. This scheme requires very little RAM but a great amount of computation.

For a one-dimensional inverse transform, to calculate a single data point at an odd index, one would need to inverse lift 7 wavelet coefficients and complete a total of 6 multiplications and 12 additions. To calculate a single data point at an even index, one would need to inverse lift 9 wavelet coefficients and complete a total of 10 multiplications and 20 additions.

Figure 14:
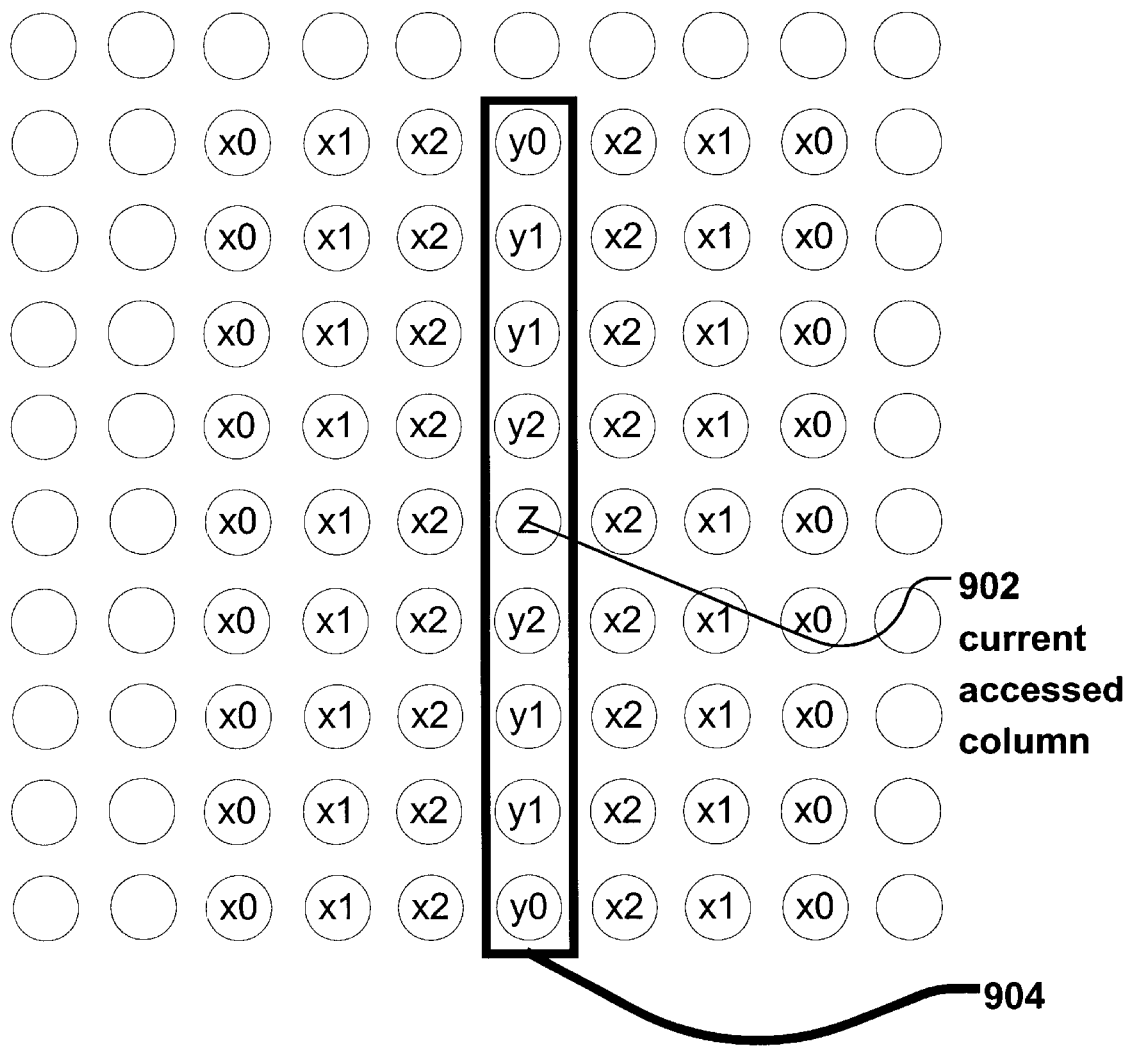
FIG. 14 is a pictorial representation of a progressive inverse wavelet transform working with a mixing cache.

The number of calculations may not seem that large until a two-dimensional case is considered, as illustrated in FIG. 14. Since in the concentric mosaic scene, the data is accessed by columns, each column of aligned mosaic image g(m,n,*) is depicted as a circle in FIG. 14. The horizontal inverse wavelet synthesis operation is performed first and then the vertical one is performed. However, the other transform order is also plausible, as the wavelet transform is 2D separable. To access a single column 902 at even horizontal and vertical index in FIG. 14, we first need to finish 9 columns of data 904 with horizontal inverse wavelet lift; this requires a total of 90 multiplication and 180 addition operations per sample point. Inverse synthesis column 902 from 9 columns of data 904 requires an additional 10 multiplication and 20 addition operations per sample point. Inverse wavelet synthesis along the height axis requires a total of 2 multiplication and 4 addition operations per sample point. In total, 102 multiplication and 204 addition operations per sample point are required to access a single column 902. If the accessed column is located on an odd horizontal and vertical index, the computation burden is reduced a little. It can be calculated that on average, 74 multiplication operations and 148 addition operations per sample point are needed to access a column in FIG. 14.

This is significantly more complex than the case where a large number of columns are accessed, whose computational complexity is 6 multiplication and 12 addition operations per sample point for inverse wavelet synthesis.

One further alternative implementation (access by block approach) would synthesize and cache a block of columns. This approach is computational simpler than the accessing by single column approach. However, synthesizing a block of columns significantly increases the computational complexity if only a single column is accessed in the block. Therefore, this alternative implementation may be very slow to render certain concentric mosaic scenes. Moreover, a block of columns synthesis requires calculating additional decoded wavelet coefficients in the neighborhood, which are not used and are discarded after the inverse wavelet synthesis operation.

Certain more preferred implementations employ a progressive inverse wavelet synthesis (PIWS) operation, wherein a mixing of the decoded coefficients, intermediate results and synthesized mosaic data are cached. For simplicity in illustrating this embodiment, the description is directed to the synthesis of the concentric mosaic scene, and to the bio-orthogonal 9-7 lifting wavelet implementation. However, the approach may be extended to other wavelet synthesis applications, and other types of wavelet filters as well. We first describe a single scale PIWS operation.

Figure 15:
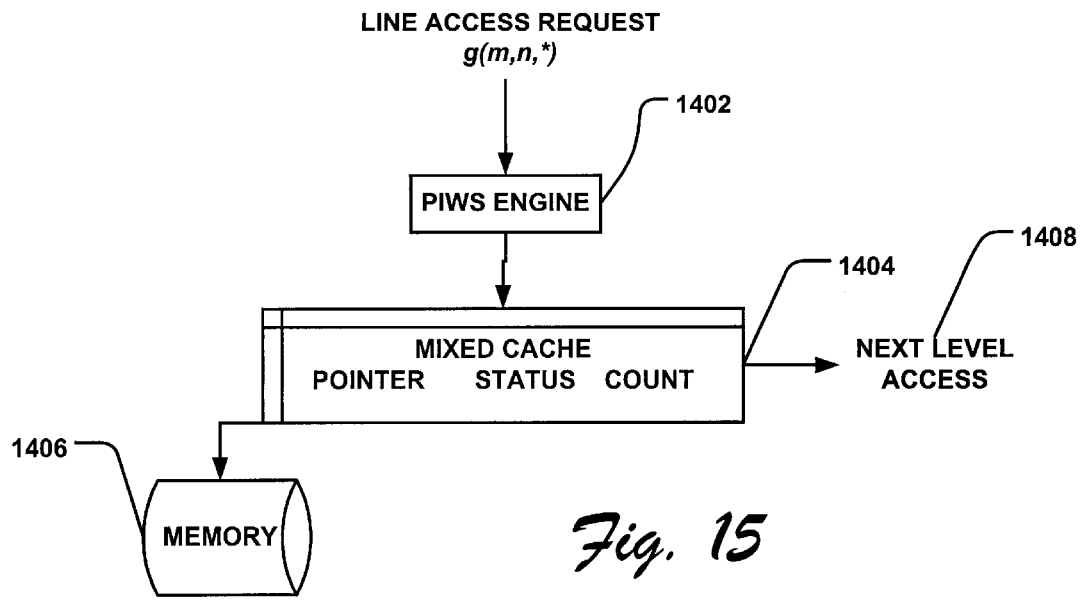
FIG. 15 is a block diagram depicting a progressive inverse wavelet synthesis (PIWS) engine.

The flowchart of PIWS operation is shown in FIG. 15. Here, a selective access request for columns g(m,n,*) is sent to the PIWS engine 1402, which is preferably configured to fulfill the access request using a minimal amount of computation and buffered memory. To accomplished this task, a 2D mixing cache 1404 is established, where one element is reversed for each accessed column g(m,n,*). The role of 2D mixing cache 1404 can be illustrated by way of FIG. 14, wherein each circle is essentially an element of 2D mixing cache 1404.

As depicted, for each cached element, there is a pointer, a status byte and a counter. The pointer identifies a memory buffer 1406, which is reserved for PIWS operation. The status indicates what is stored in the cached element. The count records how often the column is in use, and is used to determine whether the content of the column should be swapped out of cache.

PIWS engine 1402 accesses the forward transformed wavelet coefficient through a next level access call 1408, which is provided to; (1) reverse quantizer 406 whose input is linked to block entropy decoder 404 (e.g., see FIG. 3) if the wavelet coefficients are encoded to the bitstream, or (2) another PIWS engine if the wavelet coefficients are further decomposed before they are encoded to the bitstream.

Figure 16:
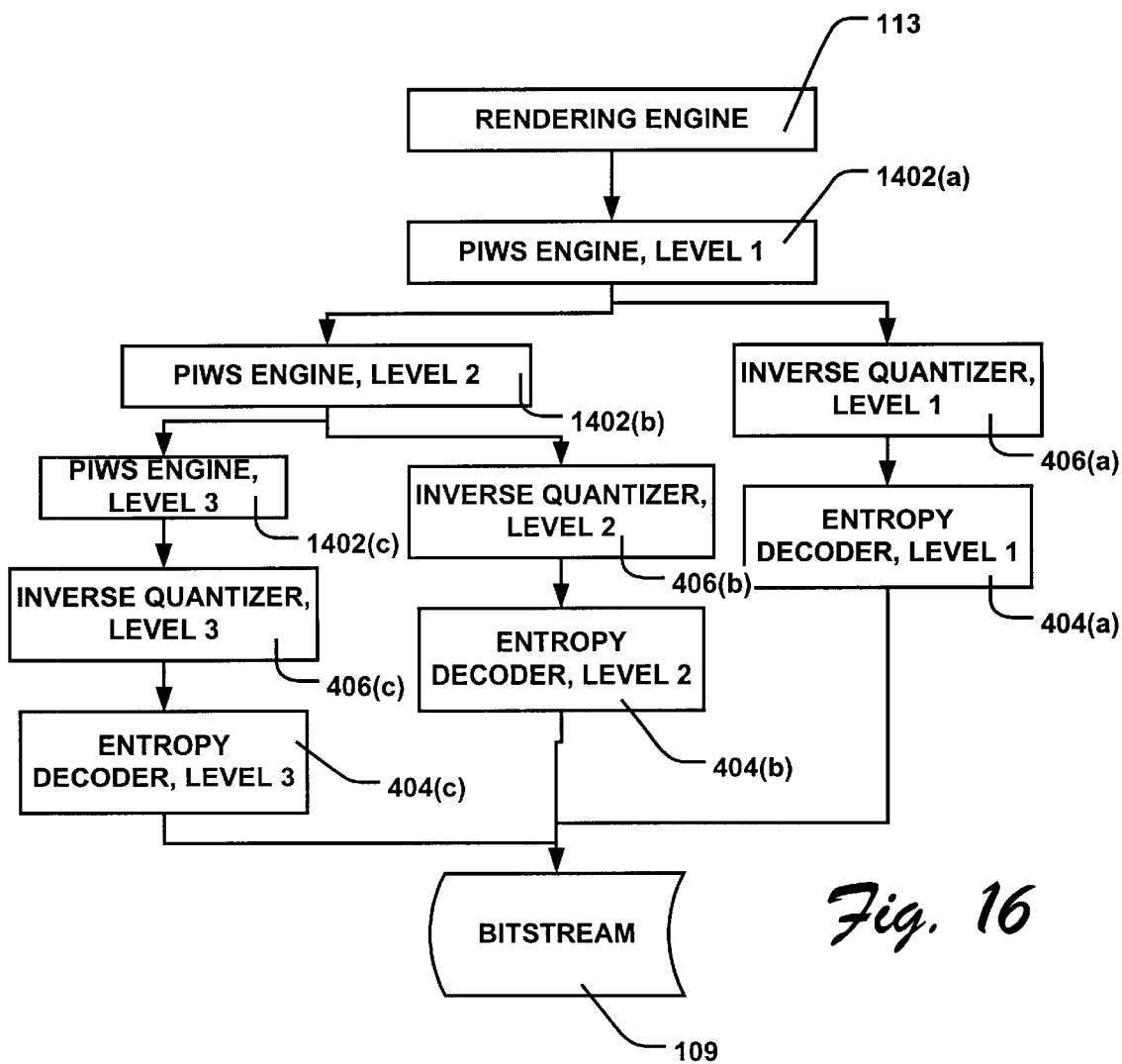
FIG. 16 is a block diagram depicting a multiscale PIWS engine with pyramidal wavelet decomposition.

A multiscale PIWS engine with pyramidal wavelet decomposition can be implemented as shown in FIG. 16. Here, rendering engine 113 calls for the access of columns g(m,n,*). The access request is provided to a first level PIWS engine 1402(a). When necessary, first level PIWS engine 1402(a) calls; (1) a second level PIWS engine 1402(b) for the access of the low pass band, and (2) a reverse quantizer 406(a) whose input is linked to a block entropy decoder 404(a) for the access of the high pass band. Second level PIWS engine 1402(b) may then call; (1) a third level PIWS engine 1402(c) for the access of the low pass band of the second scale, and (2) a reverse quantizer 406(b) whose input is linked to a block entropy decoder 404(b) for the access of the high pass band at the second level. As shown, third level PIWS engine 1402(c) then calls on a reverse quantizer 406(c) whose input is linked to a block entropy decoder 404(c).

Since the number of transformed wavelet coefficients is exactly the same as that of the original data, and the lifting wavelet implementation does not require any additional auxiliary memory during the synthesis operation, the PIWS may first occupy column g(m,n,*) with the wavelet coefficients, and then the intermediate results, and the final results, all in the same place in memory. The possible statuses of the PIWS cache for the bi-orthogonal 9-7 lifting filter are:

N: No any information of the column is available, and the pointer should be NULL. No memory is consumed.

x0: Coefficients are available and are mixed in the following way. If this is a column with even horizontal and vertical index g(2m,2n,*), it is stored with the data from the subband LLL and LLH. In the same fashion, the data in subband LHL and LLH are mixed and stored in the column g(2m, 2n+1,*), data in subband HLL and HLH are in column g(2m+1, 2n,*), and data in subband HHL and HHH are stored in column g(2m+1,2n+1,*). The first, second and the third letters in the name of the subband indicate the decomposition along the vertical, row and column axis, respectively.

x1: Coefficients have gone through first stage of horizontal wavelet lifting.

y0=x1: Coefficients have gone through all stage of horizontal wavelet lifting, but have not gone through any vertical wavelet lifting operation.

y1: Coefficients have gone through all stage of horizontal wave let lifting operation and the first stage of vertical lifting.

y2: Coefficients have gone through all stage of horizontal and vertical lifting operation, but not the column wavelet lifting.

z: Coefficients have been fully synthesized with horizontal, vertical and column wavelet lifting.

The status goes through a single direction transition with N to x0 to x1 to y0 to y1 to y2, and then to z. Notice that no cache memory needs be attached with columns at status N, as those columns are not accessible. For level 1 PIWS engine and columns that are fully synthesized, i.e., at status z, a byte is attached to each pixel of the column. For all other columns at intermediate statuses x0 to y2, or columns at status z but at a higher level PIWS engine, a more precise representation, such as float (4 bytes) or short (2 bytes), is required for each pixel.

The pointer stores the address index where the data is located. There may be auxiliary status of the column, e.g., for the N status, thus one may further define: NLH (both low and high pass portion of the column is not accessible), NL (the high pass portion of the column is accessible, but not the low pass portion), NH (the low pass portion of the column is accessible, but not the high pass portion). Furthermore, one may add statuses ZH and ZL that indicate that all coefficients of the high and low pass portion of the column are zero. Thus, for example, statuses ZH and ZL may be attached to the existing statuses for speeding up the wavelet synthesis operation, as operations may be bypassed if it is known that the low or high pass coefficients are all zero.

The following sections focus on the use of certain "basic" statuses N, x0, x1, y0, y1, y2 and z, within certain exemplary implementations.

When the PIWS engine receives an access request for column g(m,n,*), it is equivalent to request column g(m,n,*) being at status z, i.e., all synthesis operation to be performed. Therefore, the access request for column g(m,n,*) can be converted into a call of access function access(m,n,z,0), which is a recursive access function. The access function examines the status in the 2D cache, and attempts to elevate column g(m,n,*) to status z, the pseudo code of the access function can be written as follows:

```
function access( m, n, desire_status, sub_status )
{
    if ( current_status(m, n)>desire_status) (*)
        { current_status(m, n)=N; return access(m, n, desire_status, sub_status); }
    if ( current_status(m, n)==desire_status)
        { return pointer; }
    if ( desire_status==z)
        { pnt=access(m, n, y2, 1); column_wavelet_synthesis(pnt);
    change_data_type(pnt); }
    if ( desire_status==y2) {
    if (m is even)
            { l=access(m-1, n, y2, 0); r=access(m+1, n, y2, 0);
        pnt=access(m, n, y1, 0); pnt=pnt-d*(l+r); }
        else // m is odd
        {
            l=access(m-1, n, y1, 0); r=access(m+1, n, y1, 0); pnt=access(m, n, y1, 0);
        pnt=pnt-c*(l+r);
            if (sub_status==1) { access(m-1, n, y2, 0); access(m+1, n, y2, 0); }
        }
    }
    if ( desire_status==y1) {
        if (m is even)
            { l=access(m-1, n, y1, 0); r=access(m+1, n, y1, 0);
        pnt=access(m, n, x2, 1); pnt=pnt-b*(l+r); }
        else // m is odd
            { l=access(m-1, n, x2, 1); r=access(m+1, n, x2, 1);
        pnt=access(m, n, x2, 1); pnt=pnt-a*(l+r); } }
    if (desire_status==x2) {
        if ( n is even)
            { l=access(m, n-1, x2, 0); r=access(m, n+1, x2, 0);
        pnt=access(m, n, x1, 0); pnt=pnt-d*(l+r); }
        else // n is odd
        {
            l=access(m, n-1, x1, 0); r=access(m, n+1, x1, 0); pnt=access(m, n, x1, 0);
```

-continued

```
            pnt=pnt-c*(l+r);
                if ( sub_status==1) { access(m, n-1, x2, 0); access(m, n+1, x2, 0); }
        }
        if ( desire_status==x1) {
            if ( n is even)
                { l=access(m, n-1, x1, 0); r=access(m, n+1, x1, 0);
            pnt=access(m, n, x0, 0); pnt=pnt-b*(l+r); }
            else // n is odd
                { l=access(m, n-1, x0, 0); r=access(m, n+1, x0, 0);
            pnt=access(m, n, x0, 0); pnt=pnt-a*(l+r); }
        }
        if ( desire_status==x0 ) {
            if ( m is even && n is even ) { access LLL and LLH band column (m/2,
                n/2); }
            if ( m is even && n is odd ) { access LHL and LHH band column (m/2,
                (n-1)/2); }
            if ( m is odd && n is even ) { access HLL and HLH band column ((m-
                1)/2, n/2); }
            if ( m is odd && n is odd ) { access HHL and HHH bank column ((m-
                1)/2, (n-1)/2); }
            pnt=pointer;
        }
        current_status(m, n)=desire_status;
        return pnt;
}
```

The parameter a, b, c and d in the pseudo code are the lifting parameter associated with the bio-orthogonal 9-7 lifting filter.

The operation of the PIWS engine is illustrated with the access of a single column g(m,n,*) 6 902 of FIG. 14. Here, it is assumed that m and n are even numbers. The access function is called with parameter (m, n, z, 0), i.e., to access the column with fully synthesized result. This in turn calls for the access function (m,n,y2, 1), i.e., for the column to finish the horizontal and vertical synthesis, plus a column wavelet synthesis operation. Function call access (m,n,y2,1) iteratively calls for columns (m−1,n) and (m+1,n) to be in status y2, and the current column (m,n) to be in status y1. If such precondition is satisfied, the result g(m,n,y2) can be easily calculated as:

$$g(m,n,y2)=g(m,n,y1)-d^*[g(m-1,n,y2)+g(m+1,n,y2)];$$

As the iteration continues, 9 columns from (m−4,n) to (m+4,n) are called to be in status y0, which is the same as status x2. Then the horizontal synthesis operator is called into the iterative action. It turns out a total of 91 columns from (m−4,n−4) to (m+4, n+4) will be called to be in status x0, i.e., to be decoded from the bitstream. Those 91 columns are accessed through the next level access function 1408 shown in FIG. 15. The final status of the 2D cache, after call access (m,n,z,0) is returned, can be shown in FIG. 14. Although accessing a single column, the total operation of the PIWS is the same as straightforward accessing of the single column; none of the intermediate result is wasted. When a column next to the current column (m,n) is accessed by the rendering engine next time, significant computation saving can be achieved as most intermediate results are already available. Ultimately, as more and more columns are accessed, the computational complexity of PIWS approaches that of full inverse wavelet synthesis, i.e., 6 multiplications and 12 additions per sample points per scale. The quantity of data for the concentric mosaic scene is extremely large; it is impractical to cache all the data. When the available memory 1406 of FIG. 15 is used up, certain columns are discarded with statuses returned to N. Let such a column be a restart column. If a restart column is accessed, its neighbor columns may have to be restarted, as their intermediate results are no longer available. That is the work of statements (*) in the pseudo code above.

The PIWS engine calls the reverse block quantizer 406 and block entropy decoder 404 in FIG. 4 for the access of a block of coefficients encoded to the bitstream. The functionality of the block entropy decoder is to find the block where the requested column resides, to locate the block bitstream with the help of the index table in the compressed concentric mosaic, and to decode the entire block. The decoding of oct-tree encoded block follows exactly the same flow as oct-tree encoding, except that the encoding bit operation is replaced with a decoding bit operation. The same is true for the adaptive binary Golomb-Rice block coder and the context adaptive arithmetic block coder. The reverse quantizer converts the quantized coefficient into original wavelet coefficient and is implemented as:

$$w = \begin{cases} q \cdot Q + Q/2 & q > 0 \\ 0 & q = 0 \\ q \cdot Q - Q/2 & q < 0 \end{cases}$$

Experimental Results

The performance of the concentric mosaic (COM) coding with 3D wavelet is demonstrated by the experimental results presented below. Here, we investigated the efficiency of various 3D wavelet packet transforms and block entropy coding schemes. One test data set is the COM scene of a Lobby (see FIG. 17), which was shot with 1350 frames at resolution 320×240. Forming the mosaic images, the Lobby scene comprises of 320 mosaic images of resolution 1350× 240. Another test data set is the COM scene Kids (see FIG. 18), which comprises of 352 mosaic images of resolution 1462×288.

All scenes are in the YUV color space, with U and V components subsampled by a factor of 2 in both the horizontal and vertical direction. The Lobby scene is compressed at 0.2 bpp (bit per pixel) and 0.4 bpp, respectively. The Kids scene has more details, and is thus compressed at 0.4 bpp and 0.6 bpp, respectively.

The objective peak signal-to-noise ratio (PSNR) is measured between the original COM scene and the decompressed scene:

$$PSNR = 10 \log_{10} \frac{255^2}{\frac{1}{N \cdot W \cdot H} \sum [f(w, n, h) - f'(w, n, h)]^2}$$

where f(w,n,h) and f(w,n,h) are the original and reconstructed COM scene, respectively. The PSNR of the Y, U and V components are all presented in the experiment, though it is the PSNR of the Y component that matters most, as around 90% of the bitstream is formed by the compressed bitstream of the Y component.

In the first experiment, different 3D wavelet packet decompositions are investigated. Let lifting along the x, y and z axes correspond to the frame, line and horizontal lifting, respectively. Five wavelet packet decomposition structures are evaluated:

Structure A: 4-level mallat in all 3 directions (frame, line and horizontal),

Structure B: 4-level decomposition along y axis, followed by 3-level (x, z) mallat decomposition, Structure C: 4-level decomposition along y axis, followed by 4-level (x, z) mallat decomposition, Structure D: 5-level decomposition along z axis, followed by 4-level (x, y) mallat decomposition, Structure E: 5-level decomposition along x axis, followed by 4-level (y, z) mallat decomposition.

The wavelet coefficients within each subband are divided into blocks and are encoded by the tree coder with block size set to 16×16×16. The test data set is the Kids scene compressed at 0.6 bpp. The results are listed in the table shown in FIG. 19. From FIG. 19 it can be seen that a full mallat decomposition may not yield an optimal compression result. By further decomposing some bands along the y (line) axis with structure C, compression performance improves by about 0.5 dB. Comparing wavelet packet structure C and D, it is observed that further decomposing existing wavelet subbands can improve compression performance slightly. However, we do observe that the gain achieved by further wavelet decomposing beyond 4-level is rather limited. We may choose to first decomposing along the z (frame) or x (horizontal) axis with structure D and E, however, the performance is inferior to the wavelet packet structure C. Therefore, in the following described experiment, the wavelet packet structure C was used, i.e., first a 4-level line lifting is applied, followed by a 4-level mallat lifting in both the frame and horizontal direction.

In the second experiment, we investigate the performance of various block entropy coders with block size 16×16×16. We also compare the performance of 3D COM scene coding with that of MPEG-2, which treats the entire COM scene as a video and compressed it with a conventional MPEG-2 codec.

In MPEG-2, only the first image is encoded as I frame, the rest images are encoded as P frames. The MPEG-2 is used here as a benchmark, however we do note that random access using MPEG-2 is not so straightforward, making it less suitable for real time rendering. Moreover, though the PSNR performance of the MPEG coder is satisfactory, there is no guarantee of the quality of the rendered COM scene, as PSNR of the MPEG coded video usually fluctuates along the sequence.

The results are shown in the table in FIG. 20. Here it is observed that the performance of the tree coder is very close to that of the Golomb-Rice coder. Note that the computation complexity of the tree coder is lower than the Golomb-Rice coder, while the memory requirement of the tree coder is slightly higher, especially at a higher bitrate. Since the block encoder operates only on a 3D block of size 16×16×16, the memory consumed by the tree coder is limited. One might, therefore, select to employ a tree coder over a Golomb-Rice coder for certain implementations.

The more complicated arithmetic coder improves the compression performance by about 0.5 dB. Comparing MPEG-2 with 3D wavelet COM scene compression by arithmetic coder, we observe that the 3D wavelet coder loses by about 0.3 dB on average. This performance is still comparable to that of MPEG-2.

It is recognized that one may improve the performance of the 3D wavelet COM coder with further tuning. Additionally, the resolution scalability offered by the 3D wavelet and the quality scalability offered by the block embedded coder makes the 3D wavelet COM scene codec attractive in a number of environments, such as Internet streaming and browsing.

Additional Experimental Results

Further experiments have been performed to demonstrate the effectiveness of the progressive inverse wavelet synthesis (PIWS) algorithm. The testing platform was a Pentium III PC running at 500 MHz. All timing tests are collected on the concentric mosaic scene Kids (see FIG. 18), which is comprised of 1462 shot images with resolution 352×288, totaling 424 MB. The wavelet decomposition structure was a 4-level mallat decomposition, where wavelet transform is applied along all three directions, and only the low pass subband of all three directions is further decomposed in the next level.

Again it is recognized that other wavelet decomposition structures that yield better compression performance may be used. For example, one possible wavelet packet structure uses 4-level decomposition along the y-axis (vertical) followed by 4-level mallat structure in each resulting (x, z) layer. This tends to lead to an even simpler design than a full mallat decomposition, because one may simply apply the vertical inverse lifting as an end step and treat the decompression problem as two-dimensional.

In one experiment, we compare the proposed PIWS decoder with two benchmark algorithms. We assumed that all wavelet coefficients are already decoded, so that only the computation complexity of the inverse wavelet transform was investigated. The first benchmark algorithm is a simple slit decoder (SSD), where each slit accessed by the rendering engine is independently inverse wavelet transformed with no cache. It is the direct decoding/access by column approach discussed before. The second benchmark algorithm is a block selective decoder (BSD), i.e., the access by block approach discussed before. The BSD maintains a block cache, and decodes slits block-by-block. The block used in this exemplary BSD consisted of 32×32 slits. While either the SSD or the BSD may be used instead of PIWS to provide access to slits requested by the rendering engine, as demonstrated below, they are not as efficient as PIWS.

We time the speed to fully decode the concentric mosaics, as well as the speed for actual concentric mosaic viewing operation. The speed is measured in number of slits decoded per second. The larger the number is, the faster the decoder. The speed when an entire concentric mosaic scene is decoded is listed in the first row of table 1500 in FIG. 24. We observe that the decoding speed of PIWS is slightly faster than BSD (22% speed up), and is much superior to SSD (49 times faster). Although PIWS is designed for the access of random slits, it is also good at the accessing of chunk of data, and does not lose to BSD. The accessing and decoding of individual slit (SSD) is not a good option, as the computation speed is much slower than both PIWS and BSD.

Figure 22:
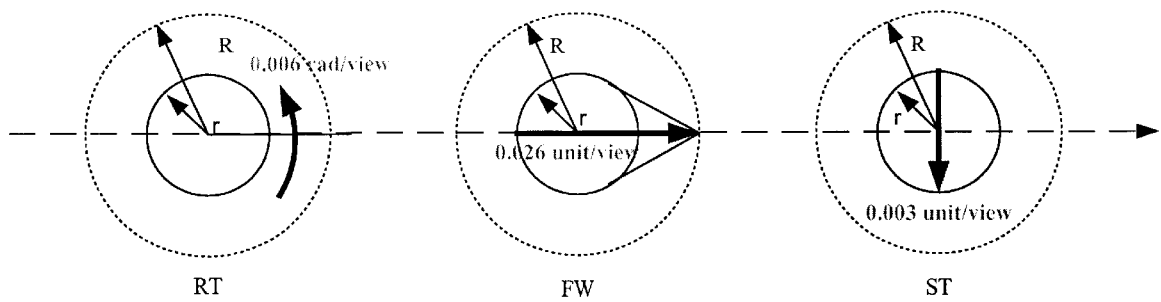
FIG. 22 illustratively depicts three types of movement within an environment recorded in concentric mosaics.

As part of the experiment, we investigated the decoding speed in an actual concentric mosaic wondering scenario. Three motion passes of the viewer are simulated, i.e., rotation, forward, and sidestep modes, as shown in FIG. 22. In the rotation (RT) mode, the viewpoint is at the center of the circle and rotates 0.006 radians per view. In the forward (FW) mode, the viewpoint starts at the edge of the inner circle and moves forward along the optical axis of the camera. In the sidestep (ST) mode, the viewpoint moves sidestep perpendicular to the optical axis of the camera.

Figure 23:
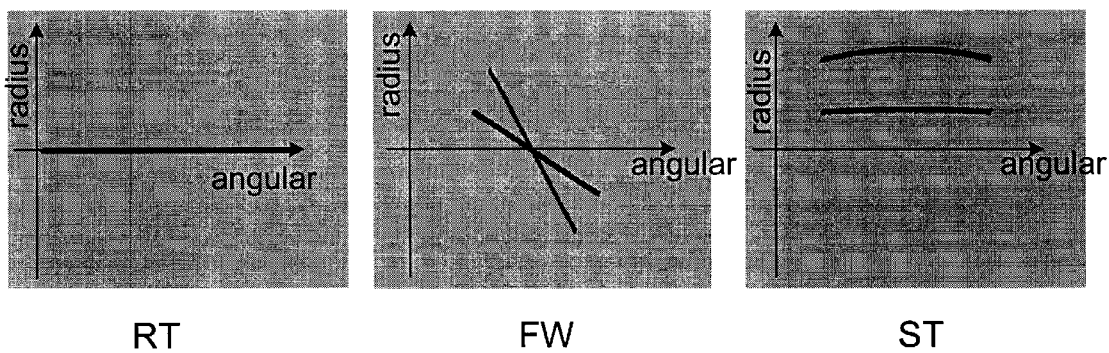
FIG. 23 includes three graphs corresponding to the three types of movement as illustrated in FIG. 22, each graph depicts the slits of two views.

The accessed slits associated with the three modes are drawn on a 2D slit plane and shown in FIG. 23, where the horizontal and the vertical axes are the angular and radius indices of the concentric mosaics, respectively. Here, we draw the accessed slits for two views of the motion modes. The RT mode accesses a set of slits parallel to the angular axis. As the viewpoint rotates, the trace slowly shifts to the right. The FW mode accesses a set of slits along a line segment. As Is the viewpoint moves forward, the line segment rotates along the slit plane. The ST mode accesses a set of slits along a bending curve, and as the viewpoint moves sidestep, the curve gradually flattens towards the radius axis. The ST mode tends to be the most computation consuming motion, while the RT mode appears to include the least computation consuming motion.

Figures 24, 25:
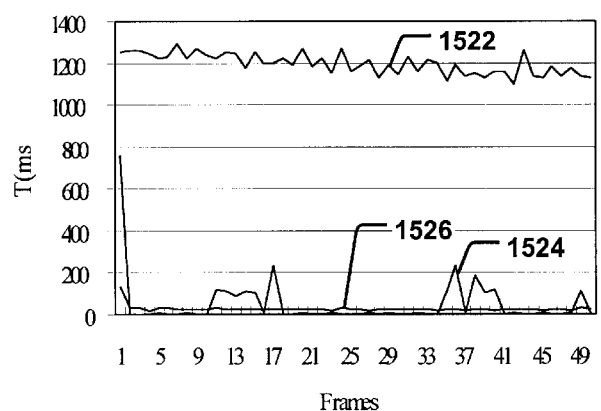
FIG. 24 is a table comparing the decoding speed of PIWS with a simple slit decoder (SSD) and a block selective decoder (BSD).
FIG. 25 is a graph depicting timing curves for the translation motion of concentric mosaics for PIWS, the SSD and the BSD.

Reference is again made to table 1500 in FIG. 24. Here, rows 2–4 record the average number of slits rendered per second for motion mode RT, FW and ST, respectively. From this experimental data, it is observed that PIWS outperforms the SSD by 35 to 44 times, and outperforms the BSD by 2 to 5 times.

The SSD rendering time has been relatively constant since no matter what the access pattern is, individual slit is decompressed and then rendered. It is the slowest as a huge number of inverse wavelet lifting is performed to decode the slits.

Although the BSD is somewhat efficient in decompressing the entire concentric mosaic data set, it does not appear to be suitable for JIT rendering, as the decoding and rendering speed of the BSD is dramatically lower than that of PIWS. In this experiment, the decoding speed of the BSD slowed down by a factor of 5.6 times in the RT mode, and 1.6 times in the ST mode. This is because in the BSD algorithm, additional decoding operations are needed for non-accessed coefficients in each block.

The time used to render each individual view of the ST mode is further plotted in a graph 1520 in FIG. 25. Here, the horizontal axis is the rendered frame, and the vertical axis is the decoding time for a specific view. Based on the experimental results, it is observed that the SSD is considerably slow (line 1522), as it takes on average 1.2 second to render each view. The rendering time of the BSD (line 1524) fluctuates greatly from 0 ms to 200 ms. This may be attributable to cache misses, and/or the fact that a large number of blocks are recovered, and at times all the accessed slits are available and a view can be rendered very fast. It was determined that the viewing experience of the BSD is not smooth, due to such fluctuations.

PIWS (line 1526), on the other hand, provides a very stable solution with the exception of the first rendered view. On average, PIWS rendered a view every 27.1 ms. Thus, PIWS provides a relatively smooth viewing experience. These exemplary results clearly demonstrate the superiority of PIWS as it achieves a minimum number of computations required in recovering a current view.

In a further experiment, we compared the rendering speed of PIWS with two existing compression and rendering systems for the concentric mosaics: a spatial vector quantization (SVQ) scheme as described by H.-Y. Shum and L.-W. He. in "Rendering with concentric mosaics", *Computer Graphics Proceedings, Annual Conference series* (*SIGGRAPH'99*), pp. 299–306, Los Angeles, August 1999; and a reference block coding (RBC) scheme as described by C. Zhang, J. Li, in "Compression and rendering of concentric mosaics with reference block codec(RBC)", SPIE Visual Communications and Image Processing 2000, SPIE 4067-05, Perth, Australia, June 2000. Both a point sampling (PS) and bilinear interpolation (BI) rendering modes are tested.

Reference is now made to Table 1600 in FIG. 26. Here, it can be observed from the frames per second rendering results that the rendering speed of PIWS while slower than the SVQ by about 26.8% and the RBC by about 11.5%, especially in the mode ST where more new slits are accessed, is nevertheless clearly acceptable for a 3D wavelet algorithm.

CONCLUSION

New methods and arrangements for the compression of IBR scenery using 3D wavelet transform techniques are provided. The proposed methods and arrangements make use of various alignment, lifting wavelet decomposition, scalar quantizer/block entropy coder, and bitstream assembler techniques. The compression performance of the various methods and arrangements is at least comparable to that of MPEG-2. However, unlike MPEG-2, the methods and arrangements provided herein allow for selective rendering and/or just-in-time rendering. Furthermore, these methods and arrangements allow for the resolution and/or the quality to be scalable/adaptable for different images, situations and computing environments.

Additionally, a progressive inverse wavelet synthesis (PIWS) algorithm has been described that requires minimal computation for the random access of 3D wavelet compressed data. With PIWS, views of the concentric mosaics can be rendered reasonably fast. Although the PIWS is designed for the rendering of the concentric mosaics, with 3D wavelet transform and biorthogonal 9-7 lifting wavelet, it can easily be extended to other applications with data access to the compressed wavelet, to other wavelet dimension and other lifting filters.

Although some preferred implementations of various methods and arrangements have been illustrated in the accompanying Drawings and described in the foregoing Description, it will be understood that the invention is not limited to the exemplary implementations disclosed, but is capable of numerous rearrangements, modifications and substitutions as set forth and defined by the following claims.

What is claimed is:

1. An arrangement comprising:
a compression engine configured to compress image-based rendering (IBR) data using a wavelet transform and output a compressed bitstream comprising encoded frequency coefficients associated with the IBR data, wherein the IBR data comprises a plurality of concentric mosaic images for a represented scene, and wherein the compression engine is further configured to align at least two of the plurality of concentric mosaic images to increase correlation between the at least two concentric mosaic images;
a decompression engine configured to receive the compressed bitstream, selectively decode portions of the compressed bitstream based on an access request, decompress the decoded portions using an inverse wavelet transform, and output decompressed IBR data, wherein the access request is based on a desired view of at least a portion of the scene; and a rendering engine configured to provide the access request to the decompression engine, the access request, the rendering engine being further configured to render the decompressed IBR data.

2. The arrangement as recited in claim 1, wherein the decompression engine is configured to identify at least one segment of the compressed bitstream corresponding to the desired view, entropy decode the segment, inverse quantize the decode segment, and then inverse wavelet transform the resulting inversely quantized and decoded segment.

3. The arrangement as recited in claim 1, further comprising memory, and wherein the decompression engine is further configured to access the memory and store the decompressed IBR data in the memory.

4. The arrangement as recited in claim 1, wherein the access request identifies at least a portion of the compressed bitstream that is required for rendering of the desired view.

5. The arrangement as recited in claim 1, wherein the rendering engine is configured to display at least a portion of the decompressed IBR data associated with the desired view via at least one output device.

6. The arrangement as recited in claim 1, wherein the IBR data includes image data associated with at least one physical object as captured by a camera.

7. The arrangement as recited in claim 1, wherein the IBR data includes image data associated with at least one virtual object created by a computer.

8. The arrangement as recited in claim 1, wherein the desired view is determined based at least on a viewpoint, a viewing direction and a field of view.

9. A method comprising:

compressing image-based rendering (IBR) data using a wavelet transform to produce a compressed bitstream comprising encoded frequency coefficients associated with the IBR data, wherein the IBR data comprises a plurality of concentric mosaic images for a represented scene, and further comprising aligning at least two of the plurality of concentric mosaic images to increase correlation between the at least two concentric mosaic images;

generating an access request based on a desired view of at least a portion of the scene;

selectively decoding portions of the compressed bitstream based on the access request;

decompressing the decoded portions using an inverse wavelet transform to provide corresponding decompressed IBR data; and rendering the decompressed IBR data.

10. The method as recited in claim 9, wherein selectively decoding portions of the compressed bitstream further includes identifying at least one segment of the compressed bitstream corresponding to the desired view, entropy decoding the segment, and inverse quantizing the decoded segment, and wherein decompressing the decoded portions further includes inverse wavelet transforming the resulting inversely quantized and decoded segment.

11. The method as recited in claim 9, wherein the access request identifies at least a portion of the compressed bitstream that is required for rendering of the desired view.

12. The method as recited in claim 9, wherein the IBR data includes image data associated with at least one physical object.

13. The method as recited in claim 9, wherein the IBR data includes image data associated with at least one virtual object.

14. The method as recited in claim 9, wherein generating an access request based on a desired view includes determining the desired view based at least on a viewpoint, a viewing direction and a field of view.

15. An arrangement comprising:

an alignment unit configured to align image-based rendering (IBR) data, which includes a plurality of concentric mosaic images for a represented scene, by aligning at least two of the plurality of concentric mosaic images to increase correlation between the at least two concentric mosaic images;

a transform unit configured to transform a resulting array of IBR data using a wavelet transform to produce corresponding frequency coefficients;

a quantizer unit configured to subdivide the frequency coefficients into a plurality of compressed frequency coefficient data blocks;

an encoder unit configured to entropy encode each of the compressed frequency coefficient data blocks independently; and an assembler unit configured to assemble and output a compressed bitstream comprising a plurality of the compressed and encoded frequency coefficient data blocks.

16. The arrangement as recited in claim 15, further comprising a capture unit configured to generate the IBR data.

17. The arrangement as recited in claim 16, wherein the capture unit is configured to scan the represented scene and generate the IBR data.

18. The arrangement as recited in claim 15, wherein the alignment unit aligns the at least two of the plurality of concentric mosaic images implicitly during a capture process associated with the capturing unit.

19. The arrangement as recited in claim 15, wherein the alignment unit determines an alignment factor $\Delta(n)$.

20. The arrangement as recited in claim 19, wherein the alignment factor $\Delta(n)$ is determined by:

$$\Delta(n) = \frac{A}{2\pi} \arctan\left[\frac{2(n - W/2)}{W} \tan\frac{FOV}{2}\right].$$

21. The arrangement as recited in claim 19, wherein the alignment factor $\Delta(n)$ is encoded in the compressed bitstream.

22. The arrangement as recited in claim 19, wherein the alignment unit aligns the image data within the array of IBR data explicitly by moveably matching adjacent image data within the array of IBR data.

23. The arrangement as recited in claim 22, wherein the alignment unit aligns the image data within the array of IBR data explicitly by moveably matching adjacent concentric mosaic images within the array of IBR data to significantly reduce the mean absolute error (MAE) between the moveably matched adjacent image data as follows:

$$MAE(n) = \sum_{m=1}^{A} \sum_{y=1}^{H} |f(n, m - \Delta(n), y) - f(n-1, m - \Delta(n-1), y)|,$$

wherein $f(n, m-\Delta(n), y)$ is the moveably matched adjacent image data n, and a consecutive displacement $\Delta(n)-\Delta$ (n−1) that minimizes the MAE is a relative alignment factor between the adjacent image data.

24. The arrangement as recited in claim 22, wherein the alignment unit to aligns the at least two concentric mosaic images within the array of IBR data explicitly by moveably matching at least two adjacent concentric mosaic images within the array of IBR data to significantly reduce the mean square error (MSE) between the moveably matched adjacent image data as follows:

$$MSE(n) = \sum_{m=1}^{A} \sum_{y=1}^{H} [f(n, m - \Delta(n), y) - f(n-1, m - \Delta(n-1), y)]^2,$$

wherein $f(n, m-\Delta(n), y)$ is the moveably matched adjacent image data n, and a consecutive displacement $\Delta(n)-\Delta(n-1)$ that minimizes the MSE is a relative alignment factor between the adjacent image data.

25. The arrangement as recited in claim 15, wherein the transform unit is configured to apply a three-dimensional separable wavelet transform on an array of IBR data to de-correlate the image data in three dimensions and compact a corresponding energy of the array of IBR data into the corresponding frequency coefficients.

26. The arrangement as recited in claim 15, wherein the transform unit is further configured to conduct a lifting operation on the array of IBR data.

27. The arrangement as recited in claim 26, wherein the lifting operation includes a frame lifting operation, a line lifting operation and a horizontal lifting operation.

28. The arrangement as recited in claim 26 wherein the lifting operation is performed along a first axis, and then on a line defined by a second axis and finally on a plane by a third axis.

29. The arrangement as recited in claim 26, wherein the lifting operation further includes a Mallat decomposition.

30. The arrangement as recited in claim 26, wherein a four-stage forward lifting operation is performed as:

$$\begin{cases} y_1(2i+1) = x(2i+1) + a[x(2i) + x(2i+2)] \\ y_2(2i) = x(2i) + b[y_1(2i-1) + y_1(2i+1)] \\ h(i) = y_3(2i+1) = y_1(2i+1) + c[y_2(2i) + y_2(2i+2)] \\ l(i) = y_4(2i) = y_2(2i) + d[y_3(2i-1) + y_3(2i+1)] \end{cases}$$

wherein $x(i)$ is the image data, $y_s(i)$ is the sth stage lifting, $h(i)$ and $l(i)$ are the high and low pass frequency coefficients, respectively.

31. The arrangement as recited in claim 26, wherein the lifting operation includes a 9-7 biorthogonal lifting operation.

32. The arrangement as recited in claim 26, wherein, for a wavelet subband with n low pass lifting and m high pass lifting, a subband weight is calculated as $w = w_L^n w_H^m$, regardless as to whether the lifting process was performed along the frame, line or horizontal axes.

33. The arrangement as recited in claim 15, wherein the quantizer unit is further configured to compressed subdivided frequency coefficient data blocks using a scalar quantizer.

34. The arrangement as recited in claim 15, wherein each of the plurality of compressed frequency coefficient data blocks is cubical in shape with regard to the array of IBR data.

35. The arrangement as recited in claim 15, wherein the quantizer unit conducts a simple quantizer operation with step Q and a dead zone 2Q, such that a forward quantizer function and an inverse quantizer function are formularized as:

$$q = \begin{cases} \lfloor w/Q \rfloor & w > 0 \\ 0 & w = 0 \\ \lceil w/Q \rceil & w < 0 \end{cases} \quad w' = \begin{cases} (q+0.5)Q & q > 0 \\ 0 & q = 0 \\ (q-0.5)Q & q < 0, \text{ wherein} \end{cases}$$

w and w' are original and reconstructed coefficients, q is a quantizer output, $\lfloor x \rfloor$ and $\lceil x \rceil$ are a floor and ceiling functions, respectively.

36. The arrangement as recited in claim 15, wherein the encoder unit is further configured to encode each of the compressed frequency coefficient data blocks in a manner that allows subsequent selective random access to each of the compressed frequency coefficient data blocks.

37. The arrangement as recited in claim 15, wherein the encoder unit provides an embedding operation, such that the compressed bitstream from the assembler unit can be efficiently truncated at a later stage.

38. The arrangement as recited in claim 15, wherein the encoder unit encodes each compressed frequency coefficient data block bitplane by bitplane and iterates from a most significant bitplane to a least significant bitplane, such that if the compressed bitstream from the assembler unit is subsequently truncated at least the most significant bitplanes of the compressed frequency coefficient data blocks are accessible.

39. The arrangement as recited in claim 15, wherein the encoder unit includes a tree coder.

40. The arrangement as recited in claim 39, wherein, within the tree coder, insignificant compressed frequency coefficients are grouped by an oct-tree, while significant compressed frequency coefficients are split into individual pixels, allowing that large areas of insignificant bits are grouped together and represented with a single value.

41. The arrangement as recited in claim 40, wherein, as the encoder unit iterates from a most significant bitplane to a least significant bitplane, an oct-tree of insignificant compressed frequency coefficients gradually splits allowing locations of significant compressed frequency coefficients to be identified.

42. The arrangement as recited in claim 40, wherein the tree coder establishes a list of insignificant sets (LIS), a list of candidate sets (LCS), a list of insignificant pixels (LIP), and a list of significant pixels (LSP), and wherein the LIS including sets of compressed frequency coefficients that are deemed insignificant, the LCS including sets of compressed frequency coefficients that are deemed insignificant but in which at least one single coefficient is significant within a bitplane, the LIP including single compressed frequency coefficients that are deemed insignificant, and the LSP including single compressed frequency coefficients that are deemed significant.

43. The arrangement as recited in claim 27, wherein the encoder unit includes a run-length coder configured to encode predicted significant bits, predicted insignificant bits, and refinement bits in accordance with a coding order.

44. The arrangement as recited in claim 43, wherein the run-length encoder includes an adaptive binary Golomb-Rice (ABGR) coder.

45. The arrangement as recited in claim 43, wherein a coding order associated with the run-length coder is determined based on a rate-distortion property of each of the different bit sets.

46. The arrangement as recited in claim 43, wherein the run-length coder includes a Huffman coder.

47. The arrangement as recited in claim 15, wherein the encoder unit includes a context-based arithmetic coder.

48. The arrangement as recited in claim 47, wherein the context-based arithmetic coder is configured to encode each of the compressed frequency coefficient data blocks by bitplanes, which are each scanned three times, as predicted significance, predicted insignificance and refinement, and wherein as a result of the predicted significant scan and predicted insignificant scan, an insignificant bit is encoded with an arithmetic coder using a context derived from a plurality of significant statuses associated with a like specified plurality of neighboring bits of a current compressed frequency coefficient.

49. The arrangement as recited in claim 15, wherein the encoder unit includes a bitplane coder.

50. The arrangement as recited in claim 49, wherein the encoder unit causes a coding rate R(l) and a distortion value D(l) of each compressed frequency coefficient data block to be recorded at the end of each bitplane.

51. The arrangement as recited in claim 50, wherein the coding rate R(l) is derived from an encoded bitstream length.

52. The arrangement as recited in claim 50, wherein the distortion value D(l) is calculated by measuring the difference between compressed frequency coefficients and their corresponding encoded and compressed frequency coefficients.

53. The arrangement as recited in claim 50, wherein the distortion value D(l) is determined by a look-up table.

54. The arrangement as recited in claim 50, wherein the distortion value D(l) is estimated.

55. The arrangement as recited in claim 15, wherein, after all the compressed frequency coefficient data blocks have been encoded, the assembler unit assembles the compressed bitstream and builds a corresponding file structure.

56. The arrangement as recited in claim 15, wherein the assembler unit includes a rate-distortion optimized bitstream assembler configured to cause the encoded frequency coefficient data blocks to be assembled within the compressed bitstream based at least in part on a rate-distortion optimizing operation.

57. The arrangement as recited in claim 56, wherein the assembler unit is configured to determine a common rate-distortion slope suitable for use with all compressed frequency coefficient data blocks, and calculate the included bits for each block.

58. The arrangement as recited in wherein a weighted rate-distortion curve of each compressed frequency coefficient data block is calculated during the embedded coding operation, and the assembler unit searches for an optimal rate-distortion slope that is tangent with the weighted rate-distortion curves of the blocks, then truncates segments of encoded and compressed frequency coefficients bits at a corresponding tangent point, and assembles the resulting truncated bit segments together to form the compressed bitstream.

59. The arrangement as recited in claim 56, wherein the assembler unit is further configured to allocate bits among different compressed frequency coefficient data blocks based on rate-distortion information for individual blocks obtained during the embedded coding operation.

60. The arrangement as recited in claim 15, wherein, the assembler unit is further configured to include identifying information within the compressed bitstream suitable for subsequent random access to portions of the compressed bitstream.

61. The arrangement as recited in claim 60, wherein the identifying information includes an index table that identifies the encoded bitstream length of each individual compressed frequency coefficient data block.

62. A method comprising:
aligning at least two of a plurality of concentric mosaic images within image-based rendering (IBR) data, wherein the plurality of concentric mosaic images represent a scene, and wherein correlation between the at least two concentric mosaic images is increased as a result of being aligned;
transforming a resulting array of IBR data using a wavelet transform to produce corresponding frequency coefficients;
quantizing the frequency coefficients into a plurality of compressed frequency coefficient data blocks;
entropy encoding each of the compressed frequency coefficient data blocks independently; and
assembling a compressed bitstream comprising a plurality of the compressed and encoded frequency coefficient data blocks.

63. The method as recited in claim 62, wherein aligning the at least two concentric mosaic images includes aligning the image data implicitly when the image data is generated.

64. The method as recited in claim 62, wherein aligning image data within the array of IBR data includes determining an alignment factor $\Delta(n)$.

65. The method as recited in claim 64, wherein assembling a compressed bitstream further includes encoding the alignment factor $\Delta(n)$ in the compressed bitstream.

66. The method as recited in claim 64, wherein aligning the at least two concentric mosaic images includes aligning the at least two concentric mosaic images explicitly by moveably matching adjacent concentric mosaic images.

67. The method as recited in claim 62, wherein transforming the array of IBR data further includes applying a three-dimensional separable wavelet transform on an array of IBR data to de-correlate the image data in three dimensions and compact a corresponding energy of the array of IBR data into the corresponding frequency coefficients.

68. The method as recited in claim 62, wherein quantizing the frequency coefficients further includes compressing subdivided frequency coefficient data blocks using a scalar quantizer.

69. The method as recited in claim 62, wherein entropy encoding each of the compressed frequency coefficient data blocks further includes encoding each of the compressed frequency coefficient data blocks in a manner that allows subsequent selective random access to each of the compressed frequency coefficient data blocks.

70. The method as recited in claim 62, wherein entropy encoding each of the compressed frequency coefficient data blocks includes using a tree coder to entropy encode each of the compressed frequency coefficient data blocks.

71. The method as recited in claim 62, wherein entropy encoding each of the compressed frequency coefficient data blocks further includes using a run-length coder to encode predicted significant bits, predicted insignificant bits, and refinement bits in accordance with a coding order.

72. The method as recited in claim 71, wherein the run-length encoder includes an adaptive binary Golomb-Rice (ABGR) coder.

73. The method as recited in claim 71, wherein the run-length coder includes a Huffman coder.

74. The method as recited in claim 62, wherein entropy encoding each of the compressed frequency coefficient data blocks further includes using a context-based arithmetic coder to entropy encode each of the compressed frequency coefficient data blocks.

75. The method as recited in claim 62, wherein entropy encoding each of the compressed frequency coefficient data blocks further includes using a bitplane coder to entropy encode each of the compressed frequency coefficient data blocks.

76. The method as recited in claim 62, wherein assembling the compressed bitstream further includes, after all the compressed frequency coefficient data blocks have been encoded, assembling the compressed bitstream and building a corresponding file structure.

77. The method as recited in claim 62, wherein assembling the compressed bitstream comprising a plurality of the compressed and encoded frequency coefficient data blocks includes using a rate-distortion optimized bitstream assembler to assemble the compressed bitstream.

78. An arrangement comprising:
    an inverse alignment unit configured to receive a compressed bitstream having a plurality of compressed and encoded frequency coefficient data blocks associated with image data within an array of image-based rendering (IBR) data, and selectively identify portions of the compressed bitstream that correspond to portions of image data within the array of IBR data required for rendering a desired view of a scene represented by the array of IBR data, wherein the array of IBR data includes a plurality of concentric mosaic images, and wherein at least two of the plurality of concentric mosaic images have been previously aligned to increased correlation there between;
    a decoder unit configured to independently entropy decode the compressed and encoded frequency coefficient data blocks as identified by the inverse alignment unit and output corresponding compressed frequency coefficient data blocks;
    an inverse quantizer unit configured to decompress the compressed frequency coefficient data blocks into a corresponding plurality of frequency coefficients; and
    an inverse transform unit configured to selectively inverse wavelet transform the frequency coefficients to produce corresponding desired IBR data required for rendering the desired view.

79. The arrangement as recited in claim 78, wherein each of the plurality of compressed frequency coefficient data blocks is cubical in shape with regard to the array of IBR data.

80. The arrangement as recited in claim 78, wherein the compressed bitstream is only partially accessed and decoding is only performed on encoded frequency coefficient data blocks associated with image data within an array of IBR data required to render the desired view.

81. The arrangement as recited in claim 78, further comprising a rendering unit configured to render a desired view using the desired IBR data.

82. The arrangement as recited in claim 78, wherein the rendering unit is configured to access the desired IBR data in the memory.

83. The arrangement as recited in claim 81, wherein, when the desired view of at least one concentric mosaic image is to be rendered, the rendering unit provides an access request for a specified number of corresponding columns in a mosaic image array.

84. The arrangement as recited in claim 78, wherein the inverse alignment unit is configured to conduct an inverse alignment process based on an alignment factor $\Delta(n)$.

85. The arrangement as recited in claim 84, wherein the alignment factor $\Delta(n)$ is encoded in the compressed bitstream and accessed by the inverse alignment unit.

86. The arrangement as recited in claim 84 wherein, as part of the inverse alignment process, the inverse alignment unit causes an accessed mosaic image column $f(n_i, m_i, y)$ to be converted into an aligned column $g(n_i, m_i + \Delta(n_i), y)$, and an accessed coordinate $n_i, m_i + \Delta(n_i)$ to be provided to the decoder unit.

87. The arrangement as recited in claim 78, wherein the decoder unit is configured to decode an oct-tree encoded frequency coefficient data block using a decoding bit operation, and wherein the inverse quantizer unit converts the compressed frequency coefficient data blocks into frequency coefficients, such that:

$$w = \begin{cases} q \cdot Q + Q/2 & q > 0 \\ 0 & q = 0 \\ q \cdot Q - Q/2 & q < 0. \end{cases}$$

88. The arrangement as recited in claim 78, wherein the inverse quantizer unit is further configured to decompress the compressed frequency coefficient data blocks using an inverse scalar quantizer.

89. The arrangement as recited in claim 88, wherein the inverse scalar quantizer includes a simple quantizer with step Q and a dead zone 2Q, such that a forward quantizer and an inverse quantizer are formularized as:

$$q = \begin{cases} \lfloor w/Q \rfloor & w > 0 \\ 0 & w = 0 \\ \lceil w/Q \rceil & w < 0 \end{cases} \quad w' = \begin{cases} (q+0.5)Q & q > 0 \\ 0 & q = 0 \\ (q-0.5)Q & q < 0, \text{wherein} \end{cases}$$

w and w' are original and reconstructed coefficients, q is the quantizer output, $\lfloor x \rfloor$ and $\lceil x \rceil$ are the floor and ceiling functions, respectively.

90. The arrangement as recited in claim 78, further comprising memory, and wherein the inverse quantizer unit is further configured to access the memory and selectively store at least a portion of the plurality of frequency coefficients in the memory, and wherein the inverse transform unit is further configured to access the memory and selectively retrieve portions of the plurality of frequency coefficients stored in the memory.

91. The arrangement as recited in claim 78, wherein the inverse transform unit is configured to apply an inverse three-dimensional separable wavelet transform to the frequency coefficients, and re-construct the image data in three dimensions.

92. The arrangement as recited in claim 78, further including memory, and wherein the inverse transform unit is further configured to determine if any portion of the desired IBR data already exists in the memory, and only inverse wavelet transforms frequency coefficients to produce corresponding desired IBR data required for rendering the desired view for any remaining portion of the desired IBR data that does not already exists in the memory.

93. The arrangement as recited in claim 78, wherein the inverse transform unit implements a progressive inverse wavelet synthesis (PIWS) operation.

94. The arrangement as recited in claim 93, wherein, as part of the PIWS operation, the inverse transform unit receives the access request from the rendering unit and in response employs a two-dimensional mixing cache.

95. The arrangement as recited in claim 93, wherein the inverse transform unit implements a plurality of PIWS operations configured to conduct a pyramidal wavelet decomposition.

96. A method comprising:
    accessing a compressed bitstream having a plurality of compressed and encoded frequency coefficient data blocks associated with image data within an array of image-based rendering (IBR) data, wherein the IBR data comprises a plurality of concentric mosaic images for a represented scene, and wherein at least two of the plurality of concentric mosaic images are aligned in such a manner as to increase correlation there between;

selectively identifying portions of the compressed bitstream that correspond to portions of image data within the array of IBR data required for rendering a desired view of the scene;

independently entropy decoding the identified portions of the compressed bitstream to provide corresponding compressed frequency coefficient data blocks;

inverse quantizing the compressed frequency coefficient data blocks into a corresponding plurality of frequency coefficients; and selectively inverse wavelet transforming the frequency coefficients to produce corresponding desired IBR data required for rendering the desired view.

97. The method as recited in claim 96, wherein each of the plurality of compressed frequency coefficient data blocks is cubical in shape with regard to the array of IBR data.

98. The method as recited in claim 96, wherein the compressed bitstream is only partially accessed and decoding is only performed on encoded frequency coefficient data blocks associated with image data within an array of IBR data required to render the desired view.

99. The method as recited in claim 96, further comprising rendering the desired view using the desired IBR data.

100. The method as recited in claim 99, wherein, when the desired view of a concentric mosaic image is to be rendered, an access request for a specified number of corresponding columns in a mosaic image array.

101. An arrangement for performing an inverse wavelet transform comprising:
a first level progressive inverse wavelet synthesis (PIWS) engine configured to inverse lift wavelet coefficients for selected concentric mosaic slits; and
a second level PIWS engine operatively coupled to the first level PIWS engine and configured to selectively access first-level low pass subband wavelet coefficients for the first level PIWS engine.

102. The arrangement as recited in claim 101, wherein the first level PIWS engine is further configured to inverse quantize and entropy decode the first level wavelet coefficients necessary to calculate the selected concentric mosaic slits.

103. The arrangement as recited in claim 101, wherein the second level PIWS engine is further configured to inverse quantize and entropy decode the second level wavelet coefficients necessary to calculate content accessed by the first level PIWS engine.

104. The arrangement as recited in claim 101, further comprising a third level PIWS engine operatively coupled to the second level PIWS engine and configured to selectively access low pass band wavelet coefficients for the selected concentric mosaic slits.

105. The arrangement as recited in claim 104, wherein the third level PIWS engine is further configured to inverse quantize and entropy decode the third level wavelet coefficients necessary for the second level PIWS engine.

106. The arrangement as recited in claim 101, further comprising a mixed cache at level one and two that is shared by the wavelet coefficient, intermediate lifting result and the reconstructed data while performing the PIWS.

* * * * *

UNITED STATES PATENT AND TRADEMARK OFFICE
CERTIFICATE OF CORRECTION

PATENT NO. : 6,567,081 B1
DATED : May 20, 2003
INVENTOR(S) : Li et al.

It is certified that error appears in the above-identified patent and that said Letters Patent is hereby corrected as shown below:

Column 21,
Line 18, replace "bank" with -- band --.
Line 30, delete "6" between ")" and "902".

Column 31,
Line 44, insert -- claim 56 -- between "in" and "wherein".

Signed and Sealed this

Thirtieth Day of March, 2004

JON W. DUDAS
*Acting Director of the United States Patent and Trademark Office*